US006732058B2

(12) United States Patent
Jin et al.

(10) Patent No.: US 6,732,058 B2
(45) Date of Patent: May 4, 2004

(54) METHOD AND APPARATUS FOR COMPUTATION REDUCTION FOR TONE DETECTION

(75) Inventors: Dongxing Jin, Ottawa (CA); Ping Wan, Kanata (CA); Derrick Remedios, Nepean (CA); Leonard Marziliano, Hull (CA)

(73) Assignee: Tropic Networks Inc., Kanata (CA)

( * ) Notice: Subject to any disclaimer, the term of this patent is extended or adjusted under 35 U.S.C. 154(b) by 197 days.

(21) Appl. No.: 10/134,382

(22) Filed: Apr. 30, 2002

(65) Prior Publication Data

US 2003/0182063 A1 Sep. 25, 2003

(30) Foreign Application Priority Data

Mar. 20, 2002 (CA) ............................................. 2377623

(51) Int. Cl.$^7$ .............................................. G06F 19/00
(52) U.S. Cl. ......................................... 702/77; 702/66
(58) Field of Search .............................. 702/57, 66, 75, 702/77; 708/403, 404, 405, 408, 409

(56) References Cited

U.S. PATENT DOCUMENTS

| 5,365,469 | A |   | 11/1994 | Mercy |          |
|-----------|---|---|---------|-------|----------|
| 5,774,388 | A |   | 6/1998  | Joanblanq et al. | |
| 5,835,392 | A | * | 11/1998 | Dulong et al. | 708/404 |
| 5,912,829 | A |   | 6/1999  | Maier |          |
| 6,061,705 | A | * | 5/2000  | Helberg | 708/408 |
| 6,122,703 | A | * | 9/2000  | Nasserbakht | 711/5 |
| 6,195,675 | B1| * | 2/2001  | Wang et al. | 708/405 |
| 6,356,926 | B1| * | 3/2002  | Andre | 708/404 |
| 6,401,162 | B1| * | 6/2002  | Nasserbakht | 711/5 |
| 6,421,696 | B1| * | 7/2002  | Horton | 708/404 |
| 6,597,161 | B2| * | 7/2003  | Jin et al. | 324/76.21 |

FOREIGN PATENT DOCUMENTS

EP        0 8109 194 A        11/1997

OTHER PUBLICATIONS

Rius, J; De Porrata–Doria, R; "New FFT Bit–Reversal Algorithm"; IEEE Transactions on Signal Processing; Vol 43 Issue 4; Apr. 1995; pp 991–994.*
Exposito, A.G., et al, "Fast Non–Recursive Computation of Indidivaul Running Harmonics", IEEE Transactions on Circuits and Systems II; Analog and Digital Processing, vol. 47, No. 8, Aug. 2000.
Mitra, S.K., et al, "DFT Calculation Via Subband Decomposition", Signal Processing 5: Theories and Applications, Proceedings of EUSIPCO 90 Fifth European Signal Processing Conference, Barcelona, Sep. 18–21, 1990.
Lyons, R., "Windowing Functions Improve FFT Results", Test and Measurement World, vol. 18, No. 10, Sep. 1, 1998.

* cited by examiner

Primary Examiner—John Barlow
Assistant Examiner—D. Washburn
(74) Attorney, Agent, or Firm—Victoria Donnelly

(57) ABSTRACT

Various methods and apparatuses are provided for performing a radix-M FFT (Fast Fourier Transform) upon N time domain samples to produce N/S frequency domain samples for detecting tones of dithers impressed on channels of a WDM (wavelength Division Multiplexed) optical signal. Successive tones have a tone frequency spacing, $\Delta f_{ta}$, and a sampling frequency, $f_s$, is chosen so that $f_s = N\Delta f_{ta}/S$. S is a spacing given by $S=M^w$ with w being an integer. The radix-M FFT is performed in $k=\log_m(N)$ stages and within the stages a reduced number of radix-M computations, when compared to the number of radix-M computations of a conventional radix-M FFT, are performed on data points associated with the N time domain samples. This is possible because successive frequency domain samples of the N/S frequency domain samples differ by $\Delta f_{ta}=S\Delta f$ where $\Delta f$ is a frequency bandwidth.

36 Claims, 20 Drawing Sheets

BIT REVERSAL
OPERATIONS
112

| | d | X(p) | p | p IN BASE M=2 | | q IN BASE M=2 | q | X(q) |
|---|---|---|---|---|---|---|---|---|
| BLOCK OF DATA 255 | 0 | X(0) | 0 | 0000 | → | 0000 | 0 | X(0) |
| | | X(1) | 1 | 0001 | → | 1000 | 8 | X(8) |
| | | X(2) | 2 | 0010 | → | 0100 | 4 | X(4) |
| | | X(3) | 3 | 0011 | →201 | 1100 | 12 | X(12) |
| BLOCK OF DATA 265 | 1 | X(4) | 4 | 0100 | → | 0010 | 2 | X(2) |
| | | X(5) | 5 | 0101 | → | 1010 | 10 | X(10) |
| | | X(6) | 6 | 0110 | → | 0110 | 6 | X(6) |
| | | X(7) | 7 | 0111 | → | 1110 | 14 | X(14) |
| BLOCK OF DATA 275 | 2 | X(8) | 8 | 1000 | → | 0001 | 1 | X(1) |
| | | X(9) | 9 | 1001 | → | 1001 | 9 | X(9) |
| | | X(10) | 10 | 1010 | → | 0101 | 5 | X(5) |
| | | X(11) | 11 | 1011 | → | 1101 | 13 | X(13) |
| BLOCK OF DATA 285 | 3 | X(12) | 12 | 1100 | → | 0011 | 3 | X(3) |
| | | X(13) | 13 | 1101 | → | 0011 | 11 | X(11) |
| | | X(14) | 14 | 1110 | → | 0111 | 7 | X(7) |
| | | X(15) | 15 | 1111 | → | 1111 | 15 | X(15) |

Column labels above table: 245 215 295 205 | 235 296 225

FIG. 2C

| | 710 | 720 | 730 | 740 |
|---|---|---|---|---|
| | d | n | w = 3 LEAST SIGNIFICANT BITS OF n | w = 3 LEAST SIGNIFICANT BITS OF N-n |
| | 0 | 8t + 0 | 000 | 000 |
| | 1 | 8t + 1 | 001 | 111 |
| | 2 | 8t + 2 | 010 | 110 |
| | 3 | 8t + 3 | 011 | 101 |
| | 4 | 8t + 4 | 100 | 100 |
| | 5 | 8t + 5 | 101 | 011 |
| | 6 | 8t + 6 | 110 | 010 |
| | 7 | 8t + 7 | 111 | 001 |

FIG. 7B

| | 750 | 760 | 770 | 780 |
|---|---|---|---|---|
| | d | n | w = 2 LEAST SIGNIFICANT BITS OF n | w = 2 LEAST SIGNIFICANT BITS OF N-n |
| | 0 | 9t + 0 | 00 | 00 |
| | 1 | 9t + 1 | 01 | 22 |
| | 2 | 9t + 2 | 02 | 21 |
| | 3 | 9t + 3 | 10 | 20 |
| | 4 | 9t + 4 | 11 | 12 |
| | 5 | 9t + 5 | 12 | 11 |
| | 6 | 9t + 6 | 20 | 10 |
| | 7 | 9t + 7 | 21 | 02 |
| | 8 | 9t + 8 | 22 | 01 |

METHOD AND APPARATUS FOR COMPUTATION REDUCTION FOR TONE DETECTION

FIELD OF THE INVENTION

The invention relates to signal processing, and more particularly to tone detection in optical systems.

BACKGROUND OF THE INVENTION

In some detection schemes, a WDM (wavelength-division multiplexed) optical signal carrying a plurality of channels has impressed upon each of its channels a respective unique dither resulting in each channel having a unique tone. Typically, the channels are modulated via amplitude modulation resulting in AM (Amplitude Modulation) tones each having a fixed modulation depth, for example, of approximately 8%. Other modulation schemes are also used. Since the tones have a fixed modulation depth, channel power is a function of the tone power and channel power is measured by detecting the tones of fixed modulation depth. To detect the tones impressed on channels of the WDM optical signal, N time domain samples of the power of the WDM optical signal are collected at a sampling frequency, $f_s$. Typically, a DFT (Discrete Fourier Transform), a radix-M FFT (Fast Fourier Transform) or any other conventional transform is performed upon the N time domain samples to produce N frequency domain samples each having a unique center frequency.

To produce N frequency domain samples from N time domain samples DFTs require a number of arithmetic operations of the order of $N^2$. In comparison, a conventional radix-M FFT requires on the order of $N\log_M(N)$ arithmetic operations. FFTs are therefore computationally efficient when compared to DFTs even for N as low as 100. However, a conventional radix-M FFT requires that the N frequency domain samples be computed simultaneously. Generally, only a fraction of the N frequency domain samples contain tones and as such only those frequency domain samples containing tones are required. Therefore since a portion, which can be significant, of the N frequency domain samples calculated are not required, the efficiency of the conventional radix-M FFT is compromised.

SUMMARY OF THE INVENTION

Various methods and apparatuses are provided for performing a radix-M FFT (Fast Fourier Transform) upon N time domain samples to produce N/S frequency domain samples for detecting tones of dithers impressed on channels of a WDM (wavelength Division Multiplexed) optical signal. Successive tones have a tone frequency spacing, $\Delta f_{ta}$, and a sampling frequency, $f_s$, is chosen so that $f_s = N\Delta f_{ta}/S$. The sampling frequency, $f_s$, is also less than or equal to a maximum sampling frequency, $f_{s,max}$, at which the time domain sample can be sampled. Center frequencies of successive frequency domain samples of the N/S frequency domain samples differ by $S\Delta f$ where S is an integer given by $S=M^w$ with w being an integer and $\Delta f = f_s/N$ being a frequency bandwidth. The radix-M FFT is performed in $k=\log_M(N)$ stages, r, where $1 \leq r \leq k$ and within each one of the stages, r, radix-M computations are performed on data points that correspond to the N time domain samples prior to the radix-M FFT. More particularly, within a stage, r, where $1 \leq r \leq w$, $N/M^r$ radix-M computations are performed and within a stage, r, where $w<r \leq k$, $N/M^{w+1}$ radix-M computations are performed. This results in a reduction in the number of radix-M computations required when compared to a conventional radix-M FFT. The methods and apparatuses may be used to measure channel power. Furthermore, the radix-M FFT may be used to operate on a sequence of 2N real valued time domain samples by re-arranging the 2N real valued time domain samples into a sequence of N complex valued time domain samples, performing the radix-M FFT upon the sequence of N complex valued time domain samples and then applying a split function to recover N/S frequency domain samples.

In accordance with a first broad aspect of the invention, provided is a method of performing a radix-M FFT (Fast Fourier Transform). M is an integer satisfying $M \geq 2$. The method involves sampling a signal, containing tones, with a sampling frequency, $f_s$, to produce N time domain samples. Each time domain sample initializes a respective one of N data points, wherein N is an integer. To produce frequency domain samples having a frequency bandwidth $\Delta f = f_s/N$ and center frequencies of frequency spacing $M^w\Delta f$ with w being an integer satisfying $w \geq 1$, in a reduced number for calculation the following steps are performed. For each one of k stages wherein $k=\log_M(N)$, radix-M computations are performed upon a respective subset of the N data points. The respective subset contains only data points upon which the frequency domain samples that contain the tones are dependent. Furthermore, the sampling frequency, $f_s$, used is such that the frequency domain samples contain the tones.

In some embodiments of the invention, for a stage, r, of the k stages wherein r is an integer satisfying $1 \leq r \leq w$, $N/M^r$ radix-M computations may be performed upon its respective subset of the N data points. Furthermore, for a stage, r, of the k stages wherein $w<r \leq k$, $N/M^{w+1}$ radix-M computations may be performed upon its respective subset of the N data points.

In some cases the tones may have a frequency spacing, $\Delta f_{ta}$, and the sampling frequency, $f_s$, may satisfy $f_s = N\Delta f_{ta}/M^w$.

The method may be applied to a WDM (Wavelength Division Multiplexed) optical signal having a plurality of channels. Some of the channels may each have impressed upon itself a unique dither resulting in a respective unique tone. The unique tone may have a tone frequency, $f_{ta}$, satisfying $f_{ta} = a\Delta f_{ta} + C$ where a is an integer and C in a positive real number. The unique tones may be detected and then converted into a power.

In accordance with another broad aspect, provided is a method of performing a radix-M FFT where M is an integer satisfying $M \geq 2$. The method includes sampling a signal, containing tones, with a sampling frequency, $f_s$, to produce a sequence of 2N real valued time domain samples, wherein N is an integer. The sequence of 2N real valued time domain samples is split into two sequences of N real valued data points and the two sequences of N real valued data points are combined into a sequence of N complex valued data points. To produce frequency domain samples having a frequency bandwidth, $\Delta f = f_s/N$, and center frequencies of frequency spacing $M^w\Delta f$ with w being an integer satisfying $w \geq 1$, the following steps are followed: 1) for each one of k stages wherein $k=\log_M(N)$, radix-M computations are performed upon a respective subset of the sequence of N complex valued data points. The respective subset contains only data points upon which the frequency domain samples are dependent; and 2) after the radix-M FFT computations have been performed for each one of the k stages, a split function is applied only to data points of the sequence of N complex valued data points upon which the frequency domain samples are dependent. Furthermore, the sampling frequency, $f_s$, is such that the frequency domain samples contain the tones.

Data points obtained from the split function which correspond to the frequency domain samples may be re-ordered using bit reversal operations.

In accordance with another broad aspect, provided is a processing apparatus which is used to perform a radix-M FFT upon N time domain samples, wherein N and M are integers with $M \geq 2$. The N time domain samples are sampled at a sampling frequency, $f_s$, from a signal containing tones to produce frequency domain samples that contain the tones. The apparatus has a memory adapted to store data which include N data points each being initialized by a respective one of the N time domain samples. The apparatus also has a processor capable of accessing the memory. The processor is used to perform, for each one of k stages wherein $k = \log_M(N)$, radix-M computations upon a respective subset of the N data points. The respective subset contains only data points upon which the frequency domain samples that contain the tones are dependent. Furthermore, the frequency domain samples have a frequency bandwidth, $\Delta f = f_s/N$, and have center frequencies of frequency spacing $M^w \Delta f$ with w being an integer satisfying $w \geq 1$ and the sampling frequency, $f_s$, is such that the frequency domain samples contain the tones.

In accordance with another broad aspect, provided is a processing apparatus used to perform a radix-M FFT upon a sequence of 2N real valued time domain samples, wherein N and M are integers with $M \geq 2$. The 2N real valued time domain samples are sampled at a sampling frequency, $f_s$, from a signal containing tones to produce frequency domain samples that contain the tones. The apparatus has a memory which is used to store data comprising the sequence of 2N real valued time domain samples. The apparatus also has a processor capable of accessing the memory. The processor is used to split the sequence of 2N real valued time domain samples into two sequences of N real valued data points and combine the two sequences of N real valued data points into a sequence of N complex valued data points. The processor then performs, for each one of k stages wherein $k = \log_M(N)$, radix-M computations upon a respective subset of the sequence of N complex valued data points. The respective subset contains only data points upon which the frequency domain samples that contain the tones are dependent. The processor then applies a split function only to data points of the sequence of N complex valued data points upon which the frequency domain samples that contain the tones are dependent. The frequency domain samples have a frequency bandwidth, $\Delta f = f_s/N$, and center frequencies of frequency spacing $M^w \Delta f$ with w being an integer satisfying $w \geq 1$. Furthermore, the sampling frequency, $f_s$, is such that the frequency domain samples contain the tones.

Data points obtained from the split function which correspond to the frequency domain samples that contain the tones may be re-ordered, using bit reversal operations.

In accordance with another broad aspect, provided is an article of manufacture. The article has a computer usable medium having computer readable program code means embodied therein for causing a radix-M FFT upon a sequence of N time domain samples, wherein N and M are integers with $M \geq 2$. The N time domain samples are sampled at a sampling frequency, $f_s$, from a signal containing tones to produce frequency domain samples that contain the tones. The N time domain samples each initialize a respective one of N data points. The computer readable code means in the article of manufacture has computer readable code means for performing, for each one of k stages wherein $k = \log_M(N)$, radix-M computations upon a respective subset of the N data points. The respective subset contains only data points upon which the frequency domain samples that contain the tones are dependent. The article has computer readable code means for determining the sampling frequency, $f_s$, so that the frequency domain samples have a frequency bandwidth, $\Delta f = f_s/N$, and have center frequencies of frequency spacing $M^w \Delta f$ with w being an integer satisfying $w \geq 1$, and so that the frequency domain samples contain the tones.

In accordance with yet another broad aspect, provided is an article of manufacture. The article has a computer usable medium having computer readable program code means embodied therein for causing a radix-M FFT upon a sequence of 2N real valued time domain samples. N and M are integers with $M \geq 2$ and the 2N real valued time domain samples are sampled at a sampling frequency, $f_s$, from a signal containing tones to produce frequency domain samples that contain the tones. The computer readable code means in the article of manufacture has computer readable code means for splitting the sequence of 2N real valued time domain samples into two sequences of N real valued data points and combining the two sequences of N real valued data points into a sequence of N complex valued data points. The article has computer readable code means for performing, for each one of k stages wherein $k = \log_M(N)$, radix-M computations upon a respective subset of the N complex valued data points. The respective subset contains only data points upon which the frequency domain samples that contain the tones are dependent. The article has computer readable code means for applying a split function only to data points of the sequence of N complex valued data points upon which the frequency domain samples are dependent. This is done after the radix-M computations are performed for each one of k stages. The article also has computer readable code means for determining the sampling frequency, $f_s$, so that the frequency domain samples have a frequency bandwidth, $\Delta f = f_s/N$, and have center frequencies of frequency spacing $M^w \Delta f$ with w being an integer satisfying $w \geq 1$, and so that the frequency domain samples contain the tones.

BRIEF DESCRIPTION OF THE DRAWINGS

Preferred embodiments of the invention will now be described with reference to the attached drawings in which:

FIG. 2C is a diagram of bit reversal operations of the 4-stage radix-2 FFT of FIG. 2B;

FIG. 7B is a table showing the correspondence between least significant bits of an index n and least significant bits of an index N-n for S=8 blocks of data with block number, d; and FIG. 7C is a table showing the correspondence between least significant bits of an index n and least significant bits of an index N-n for S=9 blocks of data.

DETAILED DESCRIPTION OF THE PREFERRED EMBODIMENTS

Figure 1A:
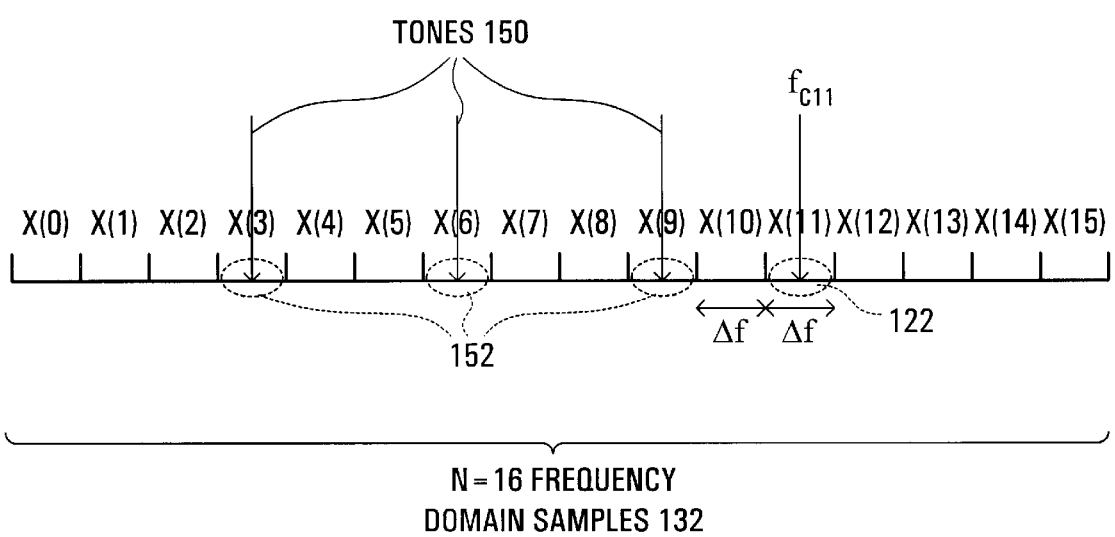
FIG. 1A is a diagram of N=16 frequency domain samples of frequency bandwidth, $\Delta f$, showing three frequency domain samples of interest each containing a respective one of three tones that require detection.

In some detection schemes, a WDM (wavelength-division multiplexed) optical signal carrying a plurality of channels has impressed upon at least one of its channels a unique dither resulting in each channel having a unique tone. Typically, the channels are modulated via amplitude modulation resulting in AM (Amplitude Modulation) tones each having a fixed modulation depth, for example, of approximately 8%. Other modulation schemes are also used. Since the tones have a fixed modulation depth, channel power is a function of the tone power and channel power is measured by detecting the tones of fixed modulation depth. To detect the tones, N time domain samples of the power of the WDM optical signal are collected at a sampling frequency, $f_s$. Typically, a DFT (Discrete Fourier Transform), a FFT (Fast Fourier Transform) or any other suitable transform is performed upon the N time domain samples to produce N frequency domain samples each having a unique center frequency, $f_{ci}$, and frequency bandwidth, $\Delta f = f_s/N$, wherein $f_{ci} = i\Delta f$ and i is an index satisfying i=0, 1, ..., N-1. This is shown in FIG. 1A in an illustrative example where N=16 time domain samples are transformed to produce N=16 frequency domain samples 132 of frequency bandwidth, $\Delta f = f_s/N$, and center frequency $f_{ci} = i\Delta f$ with i=0, 1, ..., N-1=0, 1, ..., 15. For example, a frequency domain sample 122 of the N=16 frequency domain samples 132 has a frequency bandwidth, $\Delta f$, and a center frequency, $f_{ci} = f_{c11} = 11\Delta f$. Furthermore each one of the N frequency domain samples 132 of center frequency $f_{ci} = i\Delta f$ contains frequencies in the range from $f_{ci} - \Delta f/2$ to $f_{ci} + \Delta f/2$.

To produce N frequency domain samples from N time domain samples, DFTs require a number of arithmetic operations of the order of $N^2$. In comparison, a radix-M FFT (where M=2, 3, 4, ...) requires of the order of $N\log_M(N)$ arithmetic operations. FFTs are therefore computationally efficient when compared to DFTs even for N as low as 100. However, as will be described with reference to FIG. 1B a conventional FFT requires that the N frequency domain samples be computed simultaneously. Generally, only a fraction of the N frequency domain samples contain tones and as such only those frequency domain samples containing tones are of interest and required. Therefore since only a portion of the N frequency domain samples calculated are of interest and required, the efficiency of the FFT is compromised. As an illustrative example, a WDM optical signal has three channels each having impressed upon it a unique dither and N=16 time domain samples of the power of the WDM optical signal are collected and transformed to produce the N=16 frequency domain samples 132. As shown in FIG. 1A, three frequency domain samples 152 contain three tones 150 associated with the dithers and remaining frequency domain samples of the N=16 frequency domain samples 132 do not contain tones. As such, only the three frequency domain samples 152 of the N=16 frequency domain samples 132 are of interest for the purpose of tone detection.

A conventional FFT is performed upon the N=16 time domain samples using a radix-M algorithm where M=2. For N=16 time domain samples, the FFT is performed in $k = \log_M(N) = \log_2(16) = 4$ stages resulting in a 4-stage radix-2 FFT. The 4-stage radix-2 FFT will now be discussed in detail with reference to FIGS. 1B to 1D.

Figure 1B:
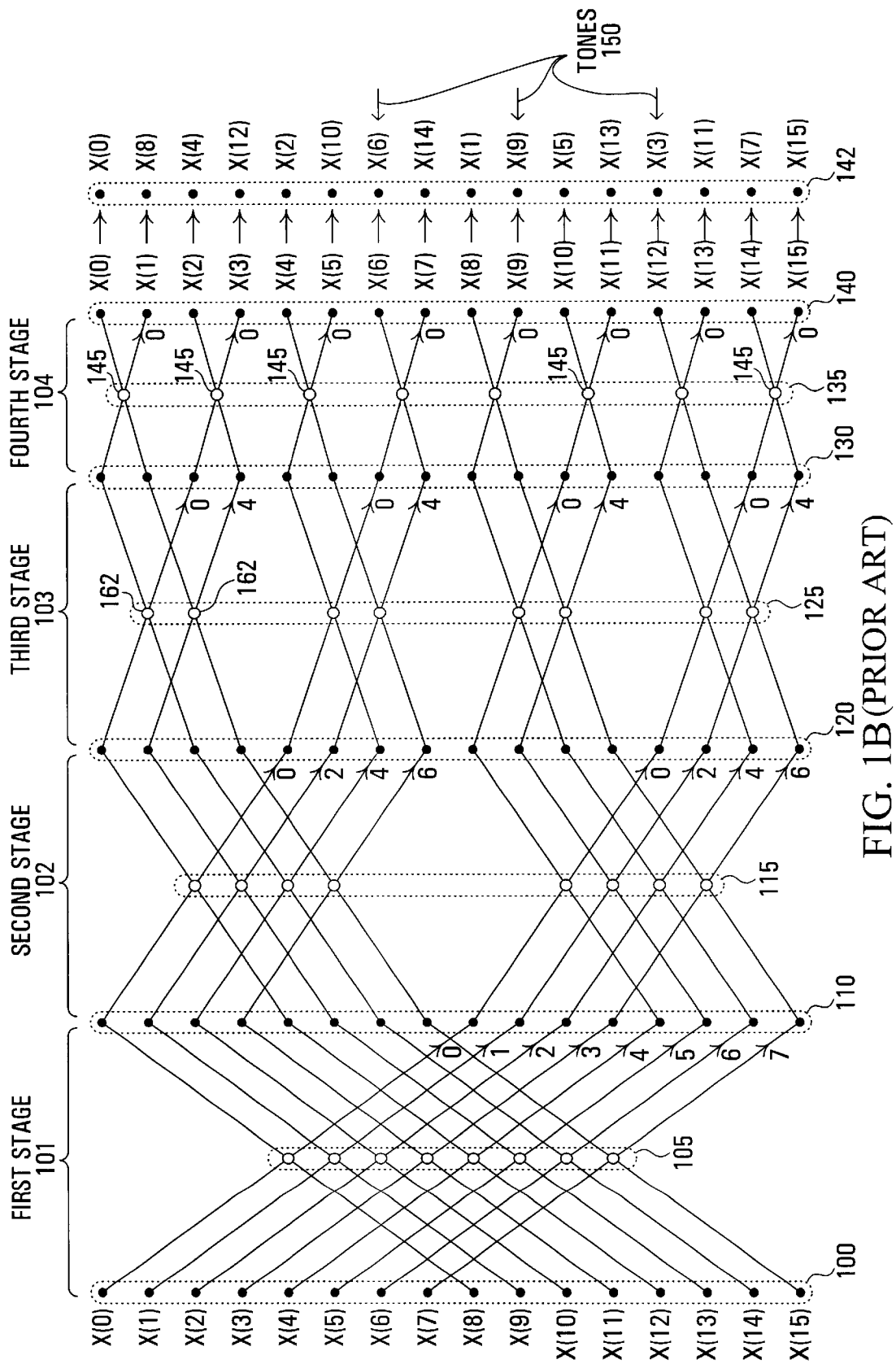
FIG. 1B is a diagram of a conventional 4-stage radix-2 FFT (Fast Fourier Transform) using DIF (Decimation In Frequency)
Figures 1C, 1D:
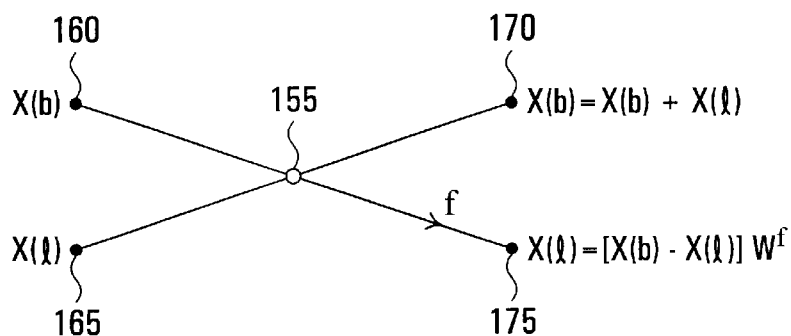
FIG. 1C is diagram of a radix-2 computation performed upon two data points X(b) and X(l) of FIG. 1B.
FIG. 1D is a diagram of bit reversal operations of the conventional 4-stage radix-2 FFT of FIG. 1B.

Referring to FIG. 1B, shown is a diagram of a conventional 4-stage radix-2 FFT using DIF (Decimation In Frequency). In general, a FFT includes several computations over one or more stages. In the conventional 4-stage radix-2 FFT of FIG. 1B, a number of computations are performed at each one of four stages to produce the conventional 4-stage radix-2 FFT. The conventional 4-stage radix-2 FFT is performed on N=16 data points X(i) (i=0 to N−1=0 to 15) at 100. At 100, the data points X(i) are each initialized by a respective one of the time domain samples, of a signal, collected at the sampling frequency, $f_s$. Within a first stage 101, a set of 8 radix-2 computations 105 are performed and new values for the data points X(i) result at 110. In a radix-2 computation, a computation is performed for each one of two points. As shown in FIG. 1C, a radix-2 computation is performed at 155 on two data points X(b) and X(l) (in the first stage 101, $0 \leq b \leq 7$ and $8 \leq l \leq 15$) at 160 and 165, respectively, and new values of X(b) and X(l) result at 170 and 175, respectively. The new values X(b) and X(l) are given by X(b)=X(b)+X(l) and X(l)=(X(b)−X(l))$W^f$, respectively, where $W^f$ is a twiddle factor with $W^f = e^{-2jf}$, wherein $$j = \sqrt{-1}$$

and f is a phase factor. In a second stage 102, new values for the data points X(i) at 110 are computed for a set of 8 radix-2 computations 115 resulting in new values of the data points X(i) being input into a third stage 103 at 120 (in the second stage 102, b=0, 1, 2, 3, 8, 9, 10, 11 and l=4, 5, 6, 7, 12, 13, 14, 15). In the third stage 103 new values for the data points X(i) at 120 are computed for a set of 8 radix-2 computations 125 resulting in new values of the data points X(i) being input into a fourth stage 104 at 130 (in the third stage 103, b=0, 1, 4, 5, 8, 9, 12, 13 and l=2, 3, 6, 7, 10, 11, 14, 15). In the fourth stage 104 new values for the data points X(i) at 130 are computed for a set of 8 butterflies 135 resulting in new values of the data points X(i) being output at 140 (in the fourth stage 104, b=0, 2, 4, 6, 8, 10, 12, 14 and l=1, 3, 5, 7, 9, 11, 13, 15). At 140 the data points X(i) correspond to frequency domain samples of the signal each having a center frequency, $f_{ci}$, which is an integral multiple of $f_s/N=f_s/16$. However, the data points are not ordered in a manner that the center frequency can be written as $f_{ci}=i\Delta f=if_s/N$ and therefore must be re-ordered at 142 by applying a bit reversal algorithm on the index i. More particularly, after having undergone radix-2 computations through the first stage 101, the second stage 102, the third stage 103 and the fourth stage 104, each data point X(p) ($0 \leq p \leq N-1=15$) of the data points X(i) is mapped, using a bit reversal operation, onto a data point X(q) ($0 \leq q \leq N-1=15$) of the data points X(i) wherein p and q are indices and q corresponds to the bit reversal of p. Bit reversal operations 112 for p=0 to N−1=0 to 15 are shown in FIG. 1D. For example, a value of p=1 is expressed as four bits 0001 in base-2 (base-M where M=2) notation and a 4 bit bit reversal operation 192 maps the four bits 0001 onto 1000 in base-2 which corresponds to q=8 in decimal notation and, consequently, X(1) is mapped onto X(8). The mapping of the data points X(p) onto the data points X(q) is shown at 142 of FIG. 1B. FIG. 1B also shows the tones 150 corresponding to the data points X(3), X(6) and X(9) which, in turn, correspond to frequency domain samples. As discussed above, only three of the of the N=16 frequency domain samples 132, corresponding to X(i), are required. However, to obtain the three data points X(3), X(6) and X(9) at 142 most of the radix-2 computations of the sets of 8 radix-2 computations 105, 115, 125, 135 are required. More particularly, to obtain the three data points X(3), X(6) and X(9) at 142, all sets of 8 radix-2 computations 105, 115, 125, 135 must be calculated except for radix-2 computations 162 of the set of 8 radix-2 computations 125 and radix-2 computations 145 of the set of 8 radix-2 computations 135. As such, the efficiency of the conventional 4-stage radix-2 FFT algorithm is compromised.

Figure 2A:
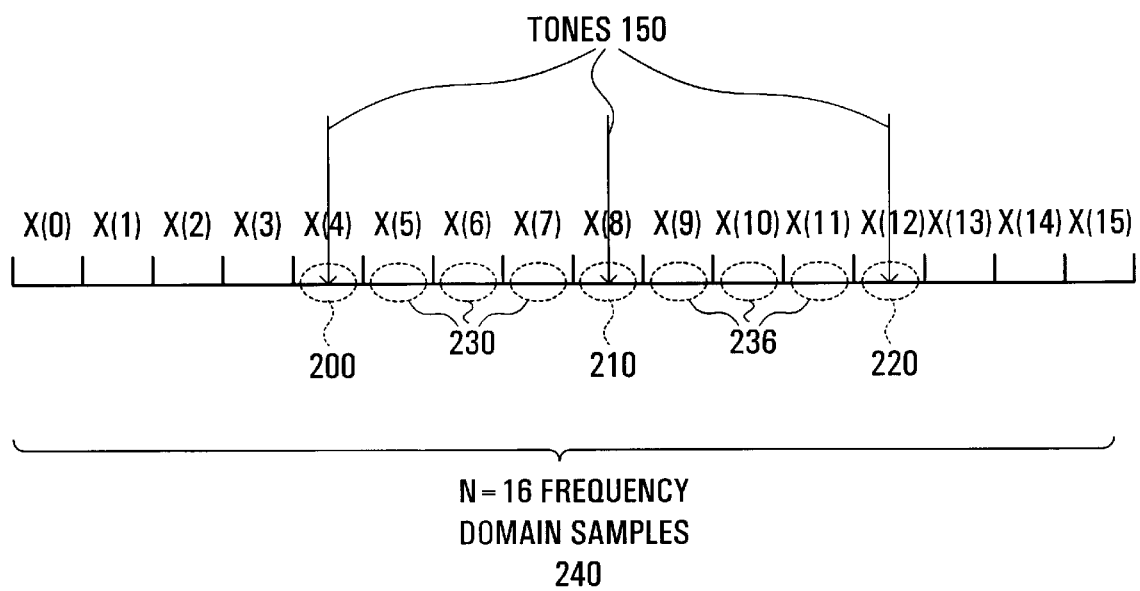
FIG. 2A is a diagram of N=16 frequency domain samples of frequency bandwidth, $\Delta f$, showing three frequency domain samples of interest each containing a respective one of three tones that require detection.

In the illustrative example of FIGS. 1B and 1C, two successive tones, of the tones 150, indexed with indices a and a+1 have tone frequencies $f_{ta}$ and $f_{ta+1}$, respectively, and have a tone frequency spacing $\Delta f_{ta}=f_{ta+1}-f_{ta}$. In embodiments of the invention, the sampling frequency, $f_s$, of the time domain samples is chosen such that the tone frequency spacing, $\Delta f_{ta}$, satisfies $\Delta f_{ta}=f_{ta+1}-f_{ta}=S\Delta f=Sf_s/N$ where $S=M^w$ and w is an integer. The sampling frequency, $f_s$, is also less than or equal to a maximum sampling frequency, $f_{s,max}$, at which the time domain sample can be sampled. The maximum sampling frequency, $f_{s,max}$, may be due to, for example, limitations on hardware used to collect the time domain samples. In a radix-M FFT of N data points the condition $\Delta f_{ta}=Sf_s/N$ results in a reduction in the number of computations required to obtain required frequency domain samples of interest. This will now be explained with reference to FIGS. 2A to 2E in an illustrative example. In the illustrative example, the tones 150 are to be detected. A radix-2 FFT is performed upon N=16 data points X(i) and the sampling frequency, $f_s$, is chosen such that tone frequencies, $f_{ta}$ and $f_{ta+1}$, of two successive tones of the tones 150 satisfy $\Delta f_{ta}=S\Delta f=Sf_s/N$ where N=16 and $S=M^w=2^w$. More particularly, in this example w=2. Since $\Delta f_{ta}=S\Delta f$ in this example, there will be $S-1=2^2-1=3$ frequency domain samples between the successive tones. This is shown in FIG. 2A where each one of three frequency domain samples 200, 210, 220 corresponding to data points X(4), X(8), X(12), respectively, contains one of the tones 150. Three frequency domain samples 230 are between the frequency domain samples 200, 210 and three frequency domain samples 236 are between the frequency domain samples 210, 220. Of N=16 frequency domain samples 240 only three frequency domain samples corresponding to the frequency domain samples 200, 210, 220 are required to be monitored for detection of the tones 150. The frequency domain samples 200, 210, 220 in which the tones 150 are contained are different than the frequency domain samples 152 of FIG. 1A in which the tones 150 are contained. This is due to a different sampling frequency.

Figure 2B:
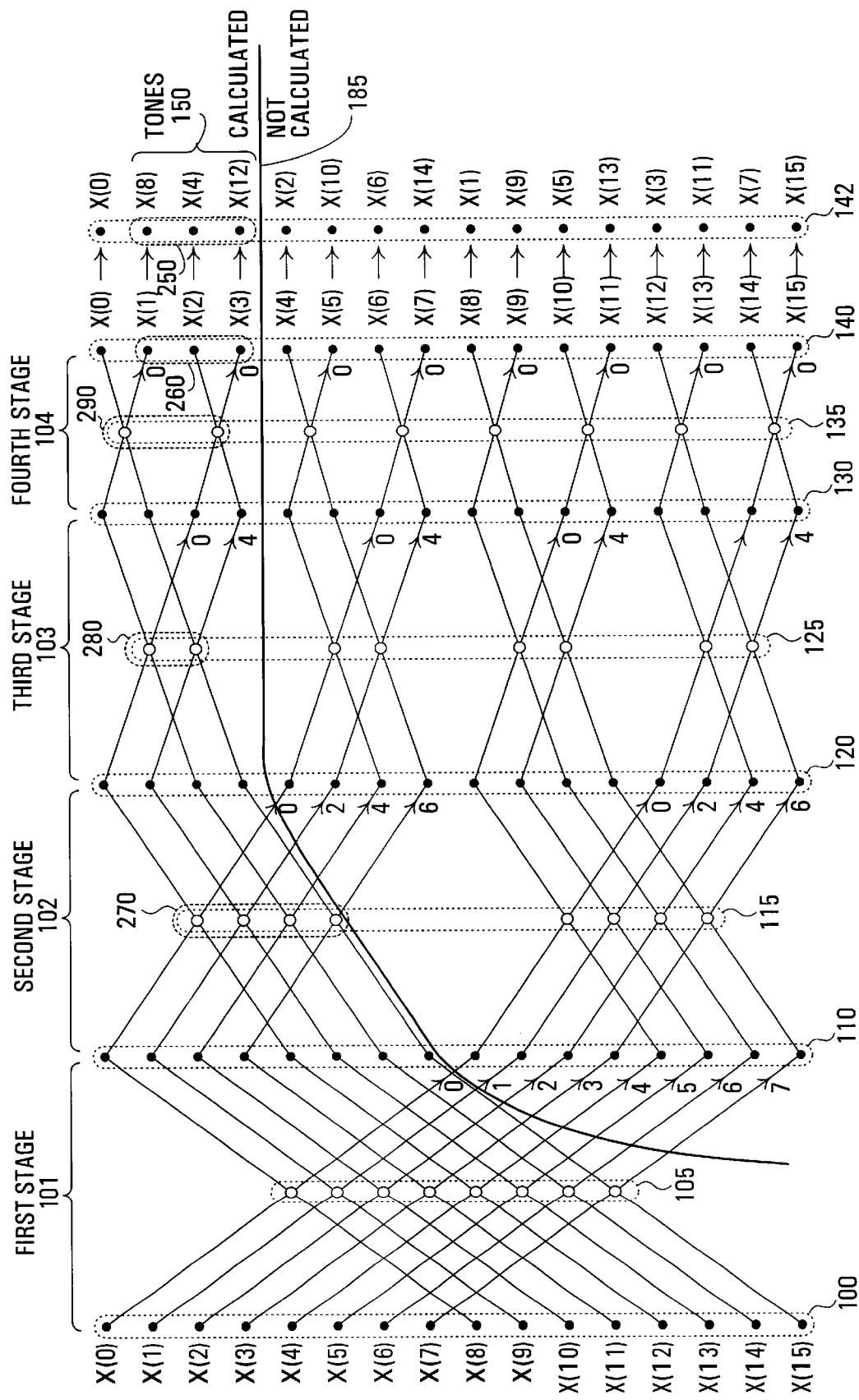
FIG. 2B is a diagram of a 4-stage radix-2 FFT using DIF, provided by an embodiment of the invention.

The tones 150 are shown in FIG. 2B which shows a diagram of a 4-stage radix-2 FFT computation using DIF, provided by an embodiment of the invention. As discussed above with reference to FIG. 2A, the tones 150 are contained in the frequency domain samples 200, 210, 220 which correspond to data points X(4), X(8), X(12), respectively. The data points X(4), X(8), X(12) are of interest, however, as discussed above with reference to FIG. 1B, in a FFT the data points X(i) must be re-ordered. As such, in FIG. 2B, the data points X(1), X(2), X(3) at 260 are mapped onto the data points X(4), X(8), X(12) at 250. Therefore, at 140, of the data points X(i), only the data points X(1), X(2), X(3) are of interest and frequency domain samples are not required for the remaining data points X(i). The data points X(1), X(2), X(3) are adjacent one another and this results in a reduction of the number of computations required to perform the 4-stage radix-2 FFT. More particularly, within each one of the first stage 101, the second stage 102, the third stage 103 and the fourth stage 104, only the particular radix-2 computations of the sets of 8 radix-2 computations 105, 115, 125, 135 which are required to compute the data points X(1), X(2), X(3) are performed. A line 185 separates radix-2 computations of the sets of 8 radix-2 computations 105, 115, 125, 135 which are calculated from those which are not calculated. More particularly, in the first stage 101, eight radix-2 computations are performed for the set of 8 radix-2 computations 105. In the second stage 102 only four radix-2 computations are performed for a sub-set of 4 radix-2 computations 270 of the set of 8 radix-2 computations 115. In the third stage 103 two radix-2 computations are performed for a sub-set of 2 radix-2 computations 280 of the set of 8 radix-2 computations 125. In the fourth stage 104 only two radix-2 computations are performed for a sub-set of 2 radix-2 computations 290 of the set of 8 radix-2 computations 135. A total of 16 radix-2 computations are performed whereas for a conventional radix-2 FFT $(N/2)\log_2(N)=(16/2)\log_2(16)=32$ computations are required. Therefore, when compared to a conventional 4-stage radix-2 FFT, the 4-stage radix-2 FFT of FIG. 2B results in a 50% reduction in the number of computations.

The condition $\Delta f_{ta}=Sf_s/N$ where $S=2^w$ is responsible for assuring that at 140 the data points of interest are adjacent one another. More particularly, in the illustrative example, the condition $\Delta f_{ta}=Sf_s/N$ assures that data points of interest, which happen to be the data points X(1), X(2), X(3) at 260, are adjacent one another prior to a bit reversal operation resulting in a reduction of the number of required radix-2 computations. This will now be discussed in more detail with reference to FIG. 2C.

Referring to FIG. 2C, shown is a diagram of bit reversal operations upon data points X(i) of the 4-stage radix-2 FFT of FIG. 2B. More particularly, FIG. 2C shows bit reversal operations 112 for mapping data points X(p) (p=0 to N−1=0 to 15) at 215 onto data points X(q) (q=0 to N−1=0 to 15) at 225 and with corresponding values of p at 295. Values of p in decimal notation are given at 295 and values of q are given at 296. The data points X(p) are grouped into blocks of data 255, 265, 275, 285 of block number d=0, d=1, d=2, d=3, respectively, at 245. Corresponding values of p at 295 are given at 205 in base M=2 notation and corresponding values of p at 296 are given at 235 in base M=2 notation. Bit reversal operations 112 are used to map the data points X(p) at 215 onto the data points X(q) at 225. For example, a bit reversal operation 201 maps the data point X(3) of p=3 with bits 0011 in base M=2 notation onto X(12) of q=12 with bits 1100 in base M=2 notation. The w=2 most significant bits of the values of p at 205 are underlined to highlight the fact that values of p within any one of the blocks of data 255, 265, 275, 285 have the same w=2 most significant bits. Furthermore, the w=2 least significant bits of the values of q at 235 are underlined to highlight the fact that values of q within any one of the blocks of data 255, 265, 275, 285 have the same w=2 least significant bits. For example, within the block of data 255, values of p=0, 1, 2, 3 have the same w=2 most significant bits 00 which corresponds to d=0 in decimal notation and again within the block of data 255, values of q=0, 4, 8, 12 have the same w=2 least significant bits 00. Since, within any one of the blocks of data 255, 265, 275, 285, values of q have the same w=2 least significant bits they must differ by $S=M^w=2^2=4$. As such, the data points X(p) within any one of the blocks of data 255, 265, 275, 285, which are adjacent one another, are mapped onto the data points X(q) having a spacing of S=4. This is the case, for example, for the block of data 255 where values of p=0, 1, 2, 3 are mapped onto values of q=0, 4, 8, 12 and therefore the data points X(0), X(1), X(2), X(3) which are adjacent one another are each mapped onto a respective one of the data points X(0), X(4), X(8), X(12) spaced with S=4. Note that although FIG. 2C shows bit reversal operations 112 for all data points, X(i), in the example, only the four data points X(0), X(1), X(2), X(3) of the block of data 255 at 215 are re-ordered using 2-bit bit reversal operations.

In the illustrative example the data points of interest correspond to X(4), X(8), X(12) which are contained in the block of data 255 of block number d=0 as shown at 245, after being re-ordered using bit reversal operations 112. Embodiments of the invention are not limited to cases where the data points of interest are contained in the block of data 255 of block number d=0. In other cases the data points of interest may be contained any one of the blocks of data 255, 265, 275, 285 and the block of data in which the data points of interest are contained depends on the tone frequencies, $f_{ta}$, of the tones 150.

Figure 2D:
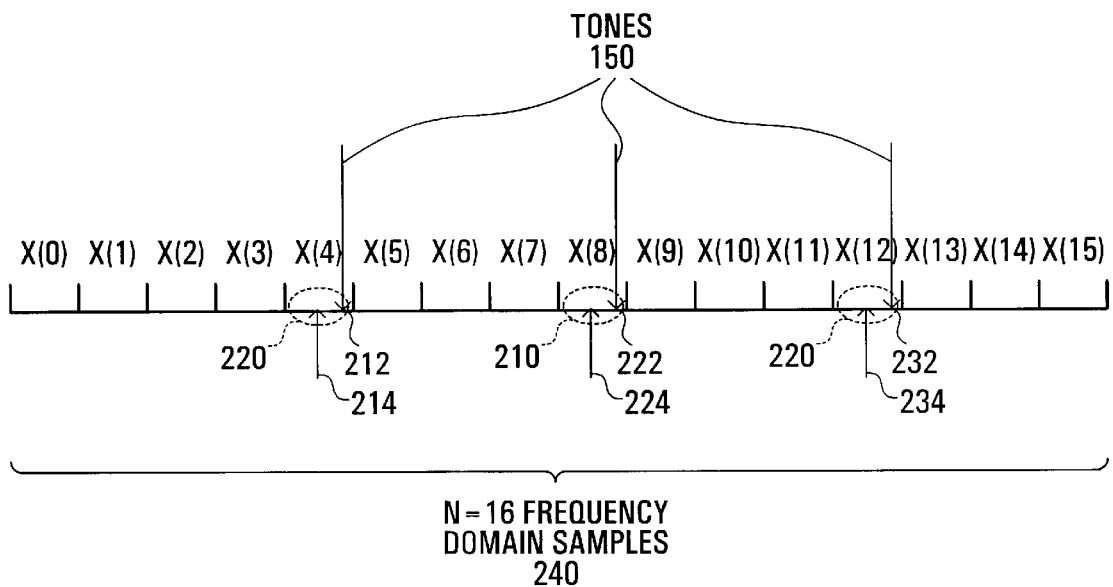
FIG. 2D is a diagram of N=16 frequency domain samples of frequency bandwidth, $\Delta f$, showing an offset of tone frequencies of the three tones of FIG. 2A from center frequencies of respective frequency domain samples.

The tone frequencies are given by $f_{ta}=a\Delta f_{ta}+C=aS\Delta f+C=aSf_s/N+C$ where C is a positive real number and a is an integer. However, given that C is a positive real number, the tone frequencies, $f_{ta}$, of the tones 150 may not correspond to center frequencies, $f_{ci}$, of respective frequency domain samples in which the tones 150 are contained. This is shown in FIG. 2D. In FIG. 2D, within each one of the frequency domain samples 200, 210, 220 is a respective one of center frequencies 214, 224, 234. FIG. 2D also shows an offset, from the center frequencies 214, 224, 234, of the tone frequencies, $f_{ta}$, of the tones 150 at 212, 222, 232, respectively. In such a case frequency leakage may affect the accuracy of results obtained from a FFT.

Figure 2E:
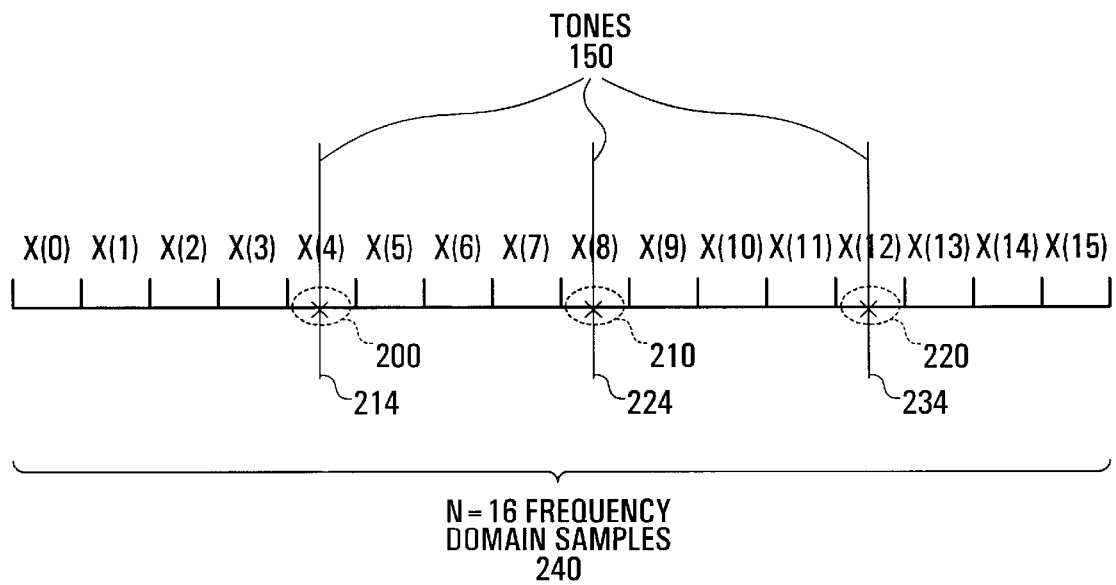
FIG. 2E is a diagram of N=16 frequency domain samples of frequency bandwidth, $\Delta f$, showing the tone frequencies of the three tones of FIG. 2A corresponding to the center frequencies of the respective frequency domain samples.

In some embodiments of the invention, the positive real constant C satisfies $C=n'\Delta f=n'f_s/N$ where n' is an integer. In such embodiments of the invention, the tone frequencies are given by $f_{ta}=(aS+n')\Delta f=(aS+n')f_s/N$ where a and n' are integers. When this condition is satisfied, as shown in FIG. 2E, tone frequencies of each one of the tones 150 are no longer offset from the center frequencies 214, 224, 234. Furthermore, a block of data of block number, d, of the data points X(i) in which the tone frequencies are contained is given by d=mod(n',S) where the function mod(n',S) gives the remainder of n'/S.

Given above is a tone frequency spacing which is given by $\Delta f_{ta}=Sf_s/N$ and therefore constant. More particularly, the tone frequency spacing between any two successive tones is the same as the tone frequency spacing of any other two successive tones. However, in other embodiments of the invention, the tone frequency spacing of two successive tones may be different than the tone frequency spacing of two other successive tones and a less stringent condition on the tone frequency spacing is that the tones be contained within bins which are equally spaced with $(S-1/2)f_s/N<\Delta f_{ta}<(S+1/2)f_s/N$. However, in such a case some of the tones may not correspond to center frequencies of respective frequency bins and frequency leakage may affect the accuracy of results obtained from a FFT.

Figure 3A:
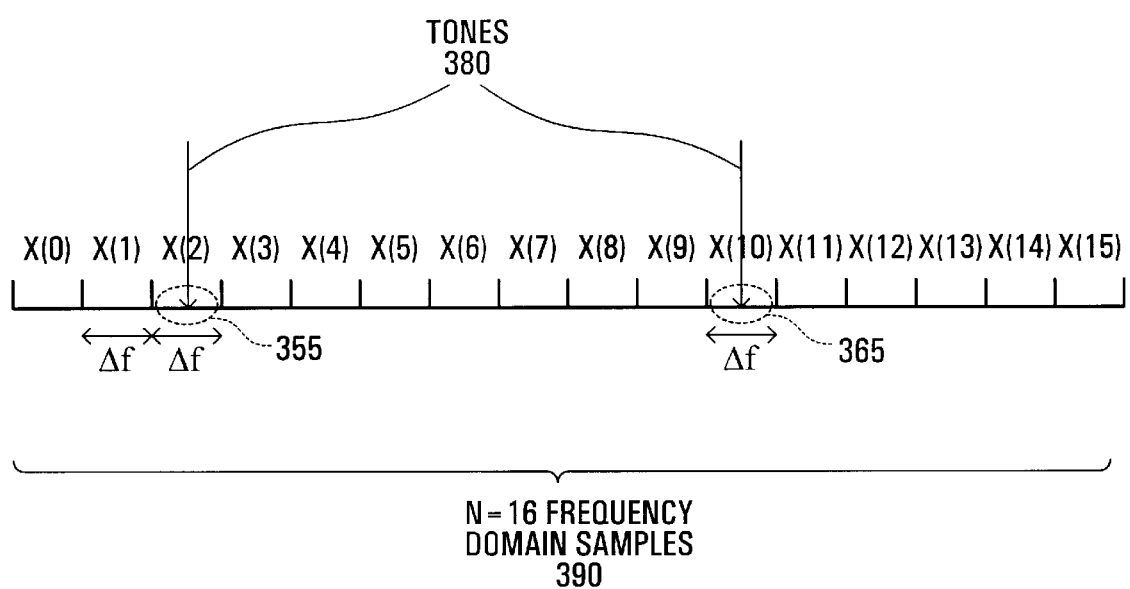
FIG. 3A is a diagram of N=16 frequency domain samples of frequency bandwidth, $\Delta f$, showing two frequency domain samples of interest in which is contained a respective one of two tones that require detection.

In the illustrative example, $C=48\times 1024$ Hz, $\Delta f_{ta}=8$ Hz and the sampling frequency, $f_s$, is chosen so that $f_s=N\Delta f_{ta}/S$ is satisfied and $S=M^w=2^2=4$. However, embodiments of the invention are not limited to w=2. Furthermore embodiments of the invention are not limited to detecting three tones. In another illustrative example two tones are to be detected. A 4-stage radix-2 FFT is used to operate on N=16 time domain samples to produce frequency domain samples. FIG. 3A shows N=16 frequency domain samples 390. The two tones are identified as tones 380 and are each contained within a respective one of frequency domain samples 355, 365 with corresponding data points X(2) and X(10), respectively. In this other illustrative example, the sampling frequency, $f_s$, is chosen so that $f_s=N\Delta f_{ta}/S$ and S=8. Since $S=M^w=8$ values of M=2 are w=3 are chosen. A $(k=\log_M(N)=\log_2(16)=4)$ 4-stage radix-2 FFT operates on the N=16 time domain samples.

Figure 3B:
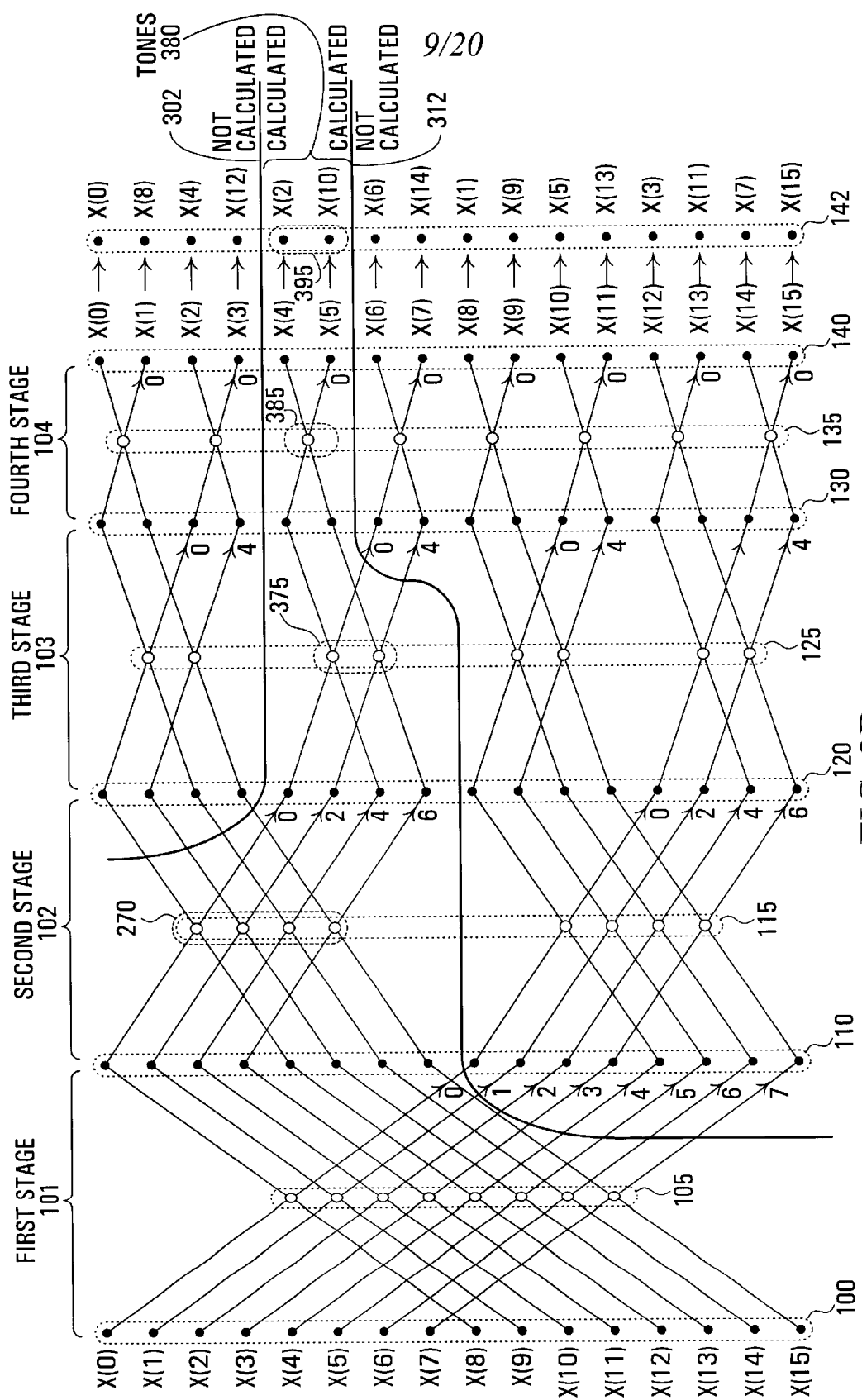
FIG. 3B is a diagram of a 4-stage radix-2 FFT using DIF, provided by another embodiment of the invention.

Referring to FIG. 3B, shown is a diagram of a 4-stage radix-2 FFT using DIF, provided by another embodiment of the invention. The two tones 380 are shown with corresponding data points X(2) and X(10). Of the radix-2 computations of the sets of 8 radix-2 computations 105, 115, 125, 135, lines 302 and 312 separate the radix-2 computations which are calculated from those which are not calculated. More particularly, in the first stage 101 eight radix-2 computations are performed for the set of 8 radix-2 computations 105. In the second stage 102, only four radix-2 computations are performed for the sub-set of 4 radix-2 computations 270 of the set of 8 radix-2 computations 115. In the third stage 103, only two radix-2 computations are performed for a sub-set of 2 radix-2 computations 375 of the set of 8 radix-2 computations 125. In the fourth stage 104, only one radix-2 computation is performed for a sub-set of 1 radix-2 computation 385 of the set of 8 radix-2 computations 135. At 395 the data points X(4), X(5) are mapped onto X(2), X(10), respectively using bit reversal operations.

Figure 3C:
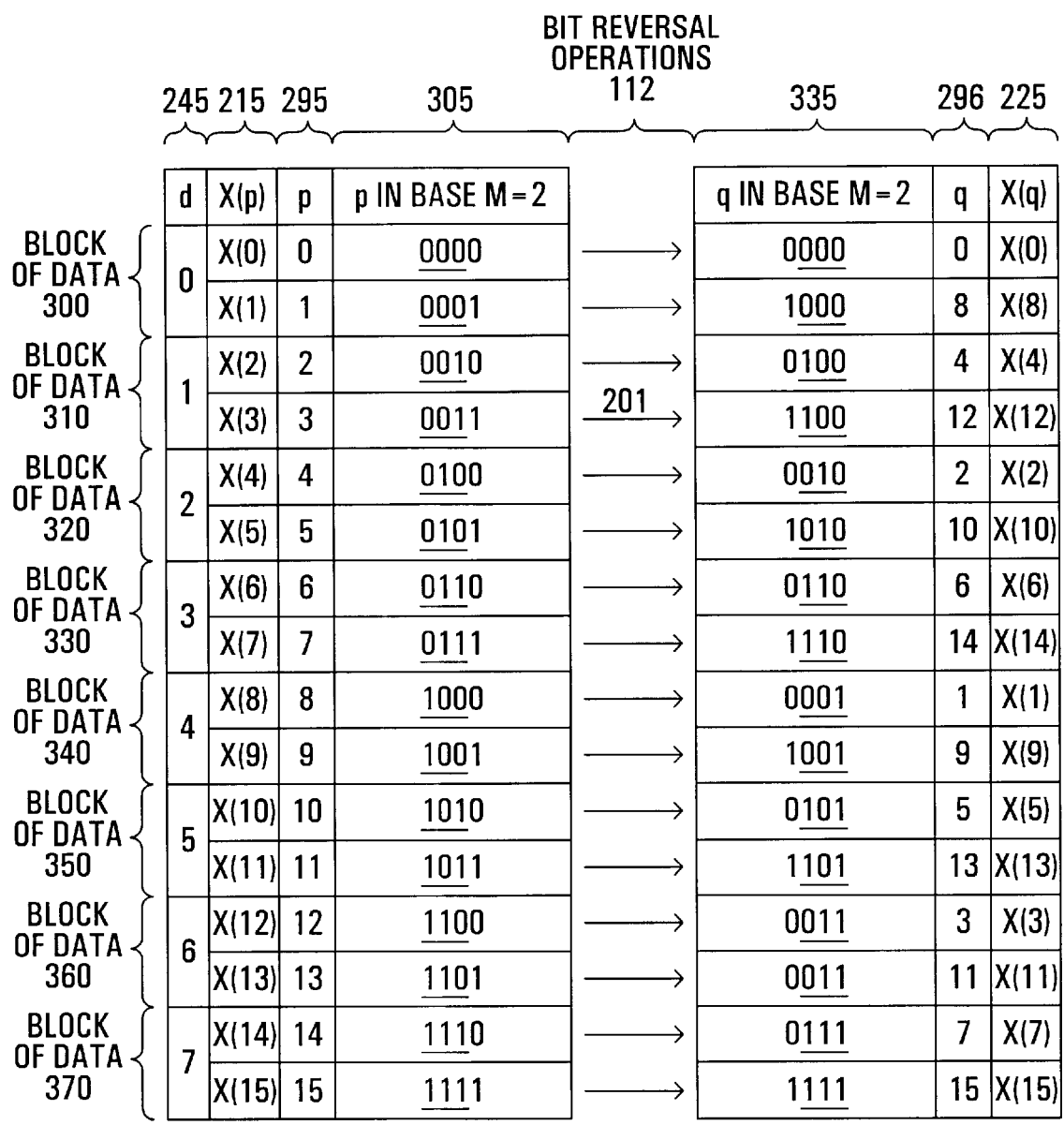
FIG. 3C is a diagram of bit reversal operations of the 4-stage radix-2 FFT of FIG. 3B.

Referring to FIG. 3C, shown is a diagram of bit reversal operations of the 4-stage radix-2 FFT of FIG. 3B. FIG. 3C shows the bit reversal operations 112 for mapping the data points X(p) (p=0 to N−1=0 to 15) at 215 onto data points X(q) (q=0 to N−1=0 to 15) at 225. The data points X(p) are grouped into blocks of data 300, 310, 320, 330, 340, 350, 360, 370 of block number, d, wherein 0≦d≦S−1=7 at 245. The w=3 most significant bits of the values of p at 305 are underlined to highlight the fact that values of p within any one of the blocks of data 300, 310, 320, 330, 340, 350, 360, 370 have the same w=3 most significant bits. Furthermore, the w=3 least significant bits of the values of q at 335 are underlined to highlight the fact that values of q within any one of the blocks of data 300, 310, 320, 330, 340, 350, 360, 370 have the same w=3 least significant bits. For example, within the block of data 300, values of p=0, 1 have the same w=3 most significant bits 000 which corresponds to d=0 in decimal notation and again within the block of data 300, values of q=0, 8 have the same w=3 least significant bits 000. Within any one of the blocks of data 300, 310, 320, 330, 340, 350, 360, 370 values of q have the same w=3 least significant bits and they differ by $S=M^w=2^3=8$. As such, the data points X(p) within any one of the blocks of data 300, 310, 320, 330, 340, 350, 360, 370, which are adjacent one another, are mapped onto the data points X(q) having a spacing with S=8. Note that although FIG. 3C shows bit reversal operations 112 for all data points, X(i), in the example, only the two data points X(4), X(5) of the block of data 320 at 215 are re-ordered using a 1-bit bit reversal operation.

Figure 4A:
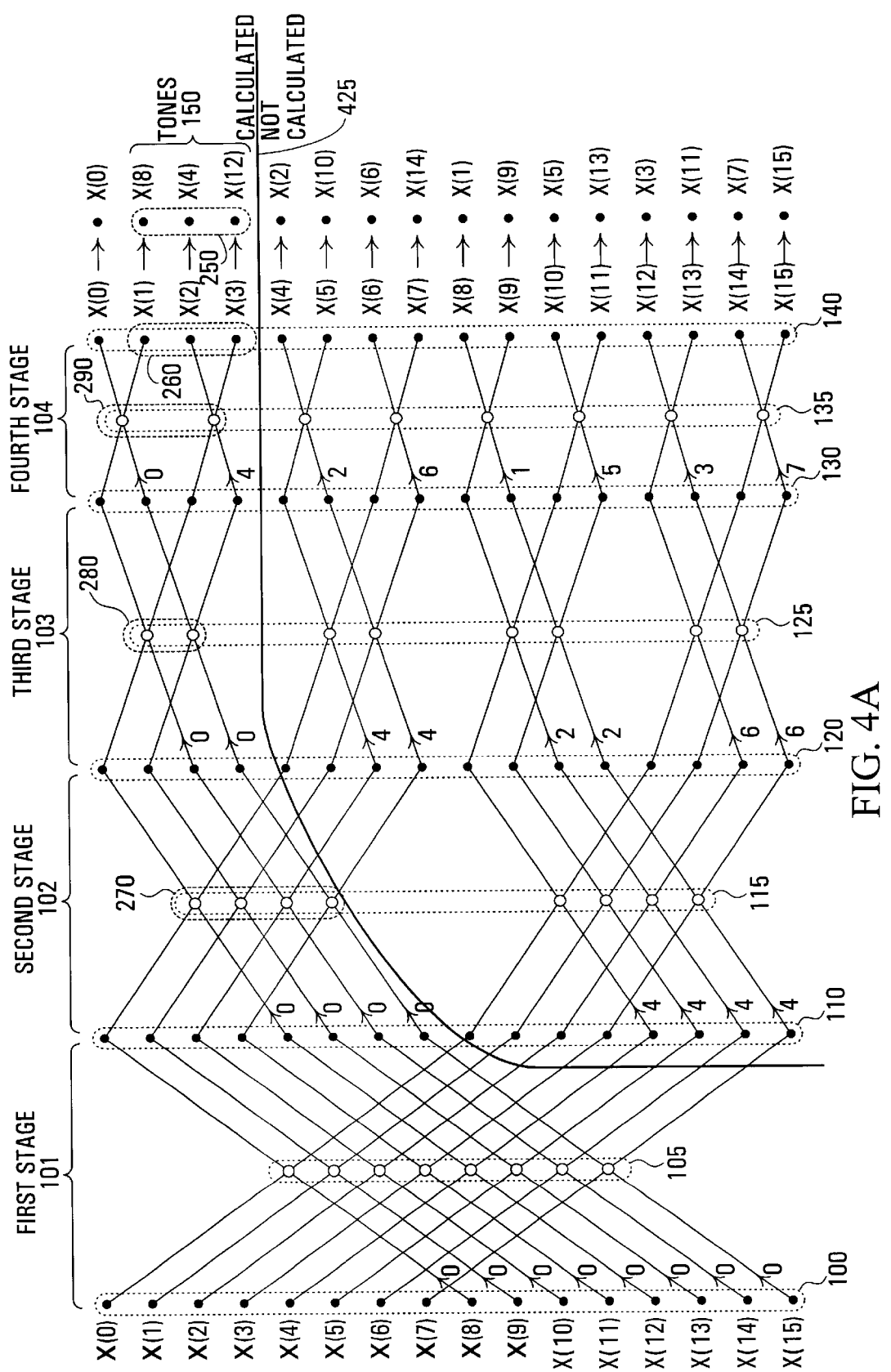
FIG. 4A is a diagram of a 4-stage radix-2 FFT using DIT (Decimation in Time), provided by another embodiment of the invention.
Figure 4B:
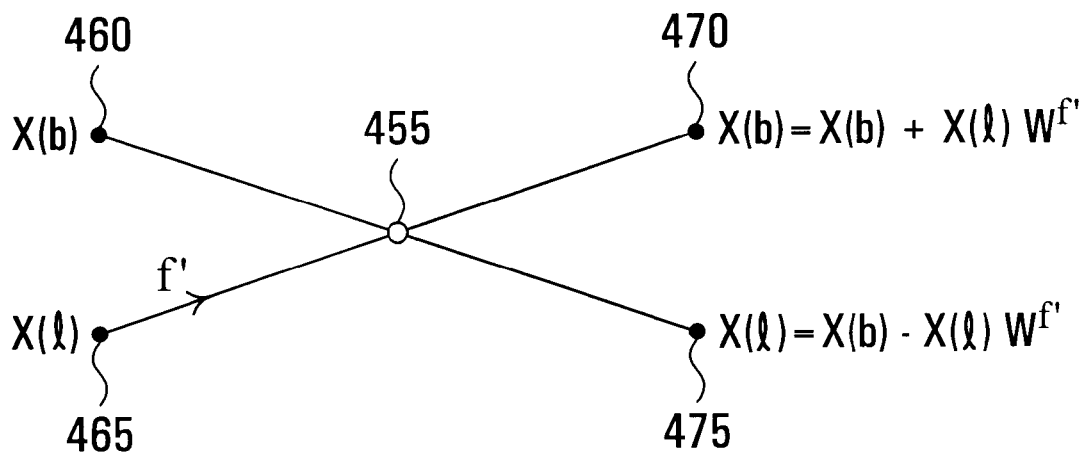
FIG. 4B is a diagram of a radix-2 computation of sets of radix-2 computations of FIG. 4A.

In some embodiments of the invention, a radix-M FFT is performed using DIT (Decimation In Time). In another example, N=16 and a radix-2 FFT, where M=2, is performed using DIT. Shown in FIG. 4A is a diagram of a 4-stage FFT using DIT, provided by another embodiment of the invention. In FIG. 4A, the radix-2 computations of the sets of 8 radix-2 computations 105, 115, 125, 135 are computed using a corresponding equation for DIT. FIG. 4B shows a diagram of a radix-2 computation of the sets of radix-2 computations 105, 115, 125, 135, of FIG. 4A. A radix-2 computation is performed at 455 on two data points X(b) and X(l) at 460 and 465, respectively, to obtain new values for X(b) and X(l) at 470 and 475, respectively. The new values of X(b) and x(l) are given by $X(b)=X(b)+X(l)\ W^f$ and $X(l)=X(b)-X(l)\ W^f$, respectively, where $W^f$ is a twiddle factor and f is a phase factor.

Figure 5A:
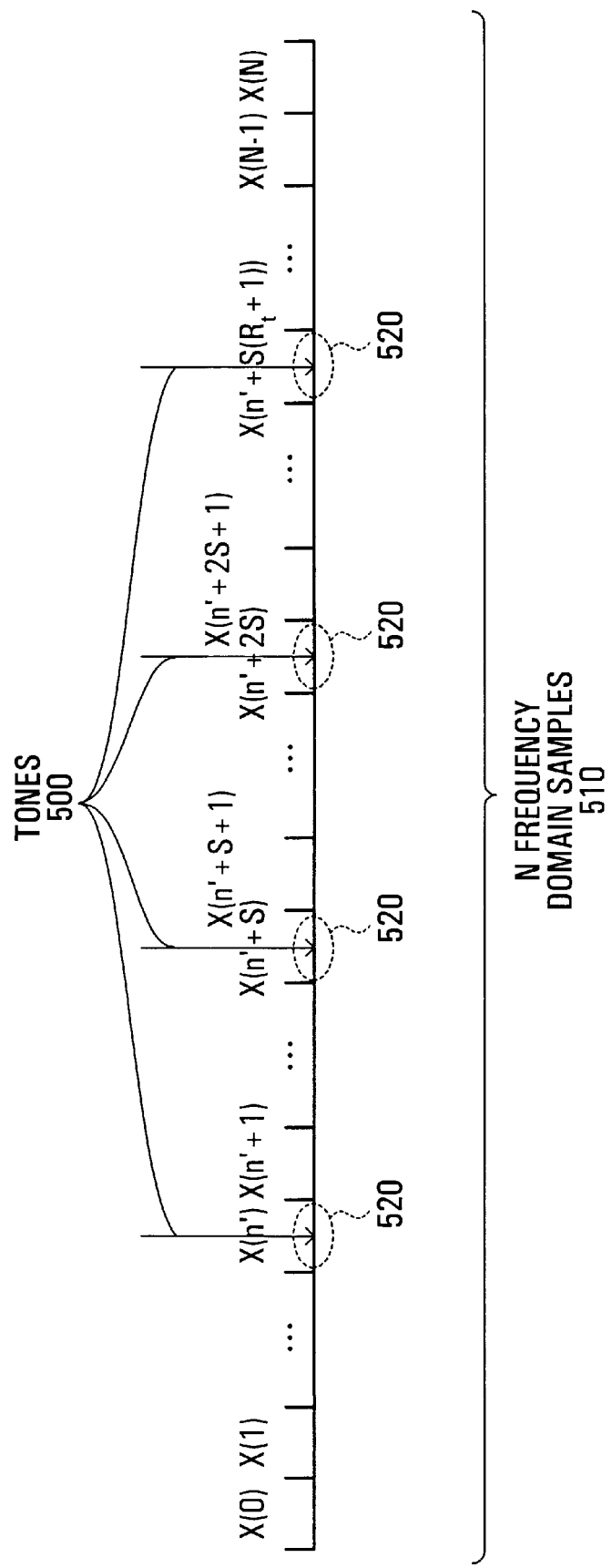
FIG. 5A is a diagram of N frequency domain samples of frequency bandwidth, $\Delta f$, showing four frequency domain samples of interest each containing a respective one of four tones that require detection.

In yet another illustrative example, provided by an embodiment of the invention, $R_t$ (where $R_t$ is an integer with $R_t \geq 1$) dithers are impressed on a signal having Q (where Q is an integer with Q≧1) channels. A radix-M (where M is an integer with M≧2) FFT is performed on N time domain samples each initializing a respective one of data points X(i) wherein i=0, 1, . . . , N−1. Each one of the dithers has a unique tone of tone frequency, $f_{ta}=a\Delta f_{ta}+C=(aS+n')\Delta f$ where a=0, 1, . . . , $R_t-1$, and the radix-M FFT produces a frequency domain sample for each one of the tones for a total of $R_f$ frequency domain samples where $R_f=R_t$. This is shown in FIG. 5A where tones 500 are contained in respective ones of frequency domain samples 520 (only four tones and four only frequency domain samples are shown for clarity) of N frequency domain samples 510. The frequency domain samples 520 have associated data points X(n'), X(n'+S), X(n'+2S), X(n'+S($R_f$−1)) of the data points X(i). The $R_f$ frequency domain samples have associated data points X(n'+aS) of the data points X(i) where 0≦a≦$R_t$−1=$R_f$−1 and respective center frequencies, $f_{ca}=(n'+aS)\Delta f=(n'+aS)f_s/N$. The spacing of two successive frequency domain samples of the $R_f$ frequency domain samples satisfies $S=M^w$. The radix-M FFT of N data points requires a $k=\log_M(N)$ stage computation and therefore the radix-M FFT is a k-stage radix-M FFT.

Figure 5B:
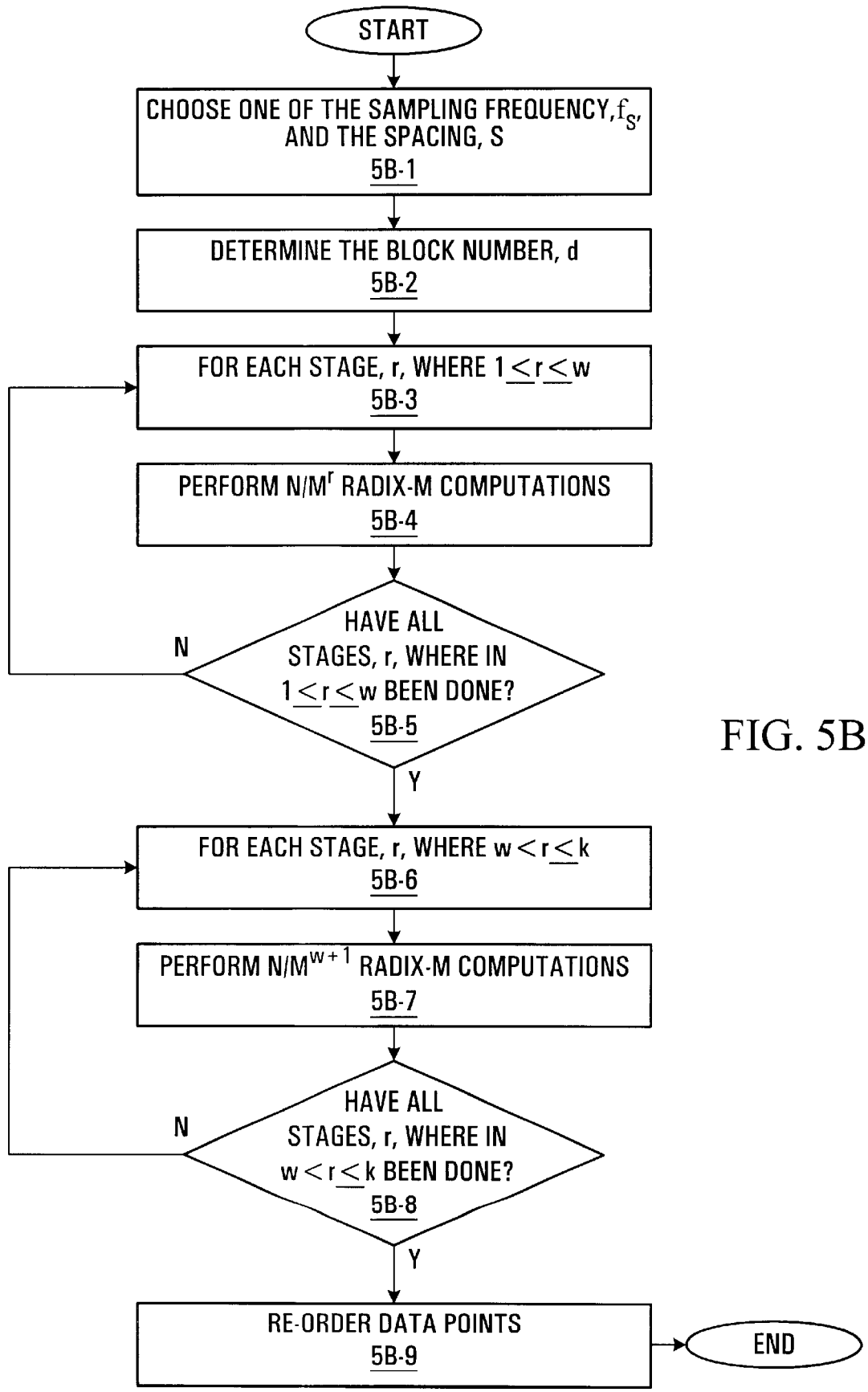
FIG. 5B is a flow chart of a method used to perform a k-stage radix-M FFT upon N time domain samples associated with the N frequency domain samples of FIG. 5A, provided by another embodiment of the invention.

Referring to FIG. 5B, shown is a flow chart of a method used to perform the k-stage radix-M FFT upon N time domain samples associated with the N frequency domain samples 510 of FIG. 5A, provided by another embodiment of the invention. At step 5B-1, the sampling frequency, $f_s$, is chosen so that $f_s=N\Delta f_{ta}/S$ is satisfied. The sampling frequency, $f_s$, is also less than or equal to the maximum sampling frequency, $f_{s,max}$, at which the time domain sample can be sampled. As discussed above, the maximum sampling frequency, $f_{s,max}$, may be due to, for example, limitations on hardware used to collect the time domain samples. For example, $f_{s,max}$ may be 250 KHz. Limitation are imposed on S. Since $\Delta f_{ta}=S\Delta f$, S is small enough so that $\Delta f$ is large enough to prevent significant frequency leakage and S is large enough so that $\Delta f=f_s/N$ is small to provide good frequency resolution. Furthermore, given S at step 5B-1 values of M and w are chosen so that $S=M^w$. In some embodiment of the invention M is fixed and w is chosen so that $S=M^w$. At step 5B-2 the block number, d, identifying a block of data, of N/S blocks of data, in which the data points X(n'+aS), which are data points of interest, may be contained after a re-ordering is determined using d=mod(n',S). For each stage, r, (step 5B-3), wherein 1≦r≦w, $N/M^r$ radix-M computations are performed (step 5B-4). More particularly, the $N/M^r$ radix-M computations are performed upon a respective subset of the N data points, upon which the data points of interest, X(n'+aS), are dependent. At step 5B-5, if all stages, r, wherein 1≦r≦w have been done then go to step 5B-6; otherwise return to step 5B-3. At step 5B-6, for each stage, r, wherein w<r≦k, $N/M^{w+1}$ radix-M computations are performed (step 5B-7). More particularly, the $N/M^{w+1}$ radix-M computations are performed upon a respective subset of the N data points, upon which the data points of interest, X(n'+aS), are dependent. At step 5B-8, if all stages, r, wherein w<r≦k have been done then N'=N/S data points within the block of data of block number, d, are re-ordered using bit reversal operations (step 5B-9) to produce the data points X(n'+aS), associated with the $R_f$ frequency domain samples; otherwise return to step 5B-6. The bit reversal operations of step 5B-9 will be discussed in detail below with reference to FIG. 6C. Once the frequency domain samples are determined, a power associated with a frequency domain sample, of the frequency domain samples, containing one of the unique tones is converted into a channel power of a respective one of the Q channels.

Step 5B-4 is repeated w times for 1≦r≦w and each time $N/M^r$ radix-M computations are performed. In addition, step 5B-7 is repeated k-w times and each time $N/M^{w+1}$ radix-M computations are performed. A total number, $N_{comp}$, of radix-M computations required to produce the $R_f$ frequency domain samples is therefore given by $$N_{comp} = \frac{N}{S}\left(\frac{k-w}{M} + \frac{M^w - 1}{M-1}\right). \quad (1)$$

For a conventional radix-M FFT a number, $N_{conv}=(N/M)\log_M(N)=(N/M)k$, radix-M computations are required and $N_{comp}<N_{conv}$.

An illustrative example of the method of FIG. 5B will now be described. In the illustrative example, $R_t=16K=16\times 1024$ dithers are impressed on a signal having $Q=R_t=16K$ channels. A radix-2 (where M=2) FFT is performed on $N=128K=128\times 1024=2^{17}$ time domain samples initializing data points X(i) wherein i=0, 1, ..., N−1. Tone frequencies of tones associated with the $R_t=16K$ dithers are given by $f_{ta}=a\Delta f_{ta}+C=(aS+n')\Delta f$ where a=0, 1, ..., $R_t-1=0, 1, \ldots$, 16K−1, $\Delta f_{ta}=8$ Hz and C=48×1024 Hz and $R_f=R_t=16K$ frequency domain samples associated with the data points X(n'+aS) of the data points X(i) are of interest. The spacing of $S=M^w=2^3=8$ where M=2 and w=3 and the sampling frequency, $f_s$, is chosen (step 5B-1) such that $f_s=N\Delta f_{ta}/S=128\times 1024(8\text{ Hz})/8=128\times 1024$ Hz. As such, $n'=C/\Delta f=CN/f_s=(48\times 1024\text{ Hz})(16\times 1024)/(128\times 1024\text{ Hz})=6\times 1024$ and at step 5B-2 the block number, d, a block of data in which the data points X(n'+aS) are contained, after being re-ordered, is given by d=mod(n',S)=mod(6×1024,8)=0. The $R_f=R_t=16K$ frequency domain samples have center frequencies, $f_{ca}=(n'+aS)\Delta f=(n'+aS)f_s/N=(6\times 1024+8a)(128\times 1024\text{ Hz})/(128\times 1024)=(6\times 1024+8a)$ Hz. For each stage, r, (step 5B-3), wherein $1\leq r\leq w=3$, $N/M^r=128K/2^r$ radix-2 computations are performed (step 5B-4). For example, for stage r=1, $128K/2^1=64K$ radix-2 computations are performed, for stage, r=2, $128K/2^2=32K$ radix-2 computations are performed and for stage r=3, $128K/2^3=16K$ radix-2 computations are performed (step 5B-4). At step 5B-5, if all stages, r, wherein $1\leq r\leq w=3$ have been done then go to step 5B-6; otherwise return to step 5B-3. At step 5B-6, for stage, r, wherein $3=w<r\leq k=\log_M(N)=\log_2(2^{17})=17$, $N/M^{w+1}=128K/2^{3+1}=8K$ radix-2 computations are performed (step 5B-7). At step 5B-8, if all stages, r, wherein $3<r\leq 17$ have been done then data points within the block of data of block number, d, are re-ordered using bit reversal operations (step 5B-9); otherwise return to step 5B-6. According to equation (1), for N=16K, S=8, k=17, w=3 and M=2, the number of radix-2 computation, $N_{comp}$, required is $N_{comp}=1.75N$ where N=16K whereas for a conventional radix-2 FFT, $N_{conv}=(N/M)k=(N/2)17=8.5N$. Therefore in the example, the number of required radix-2 computations is approximately 20.6% of a conventional radix-2 FFT.

Figure 6A:
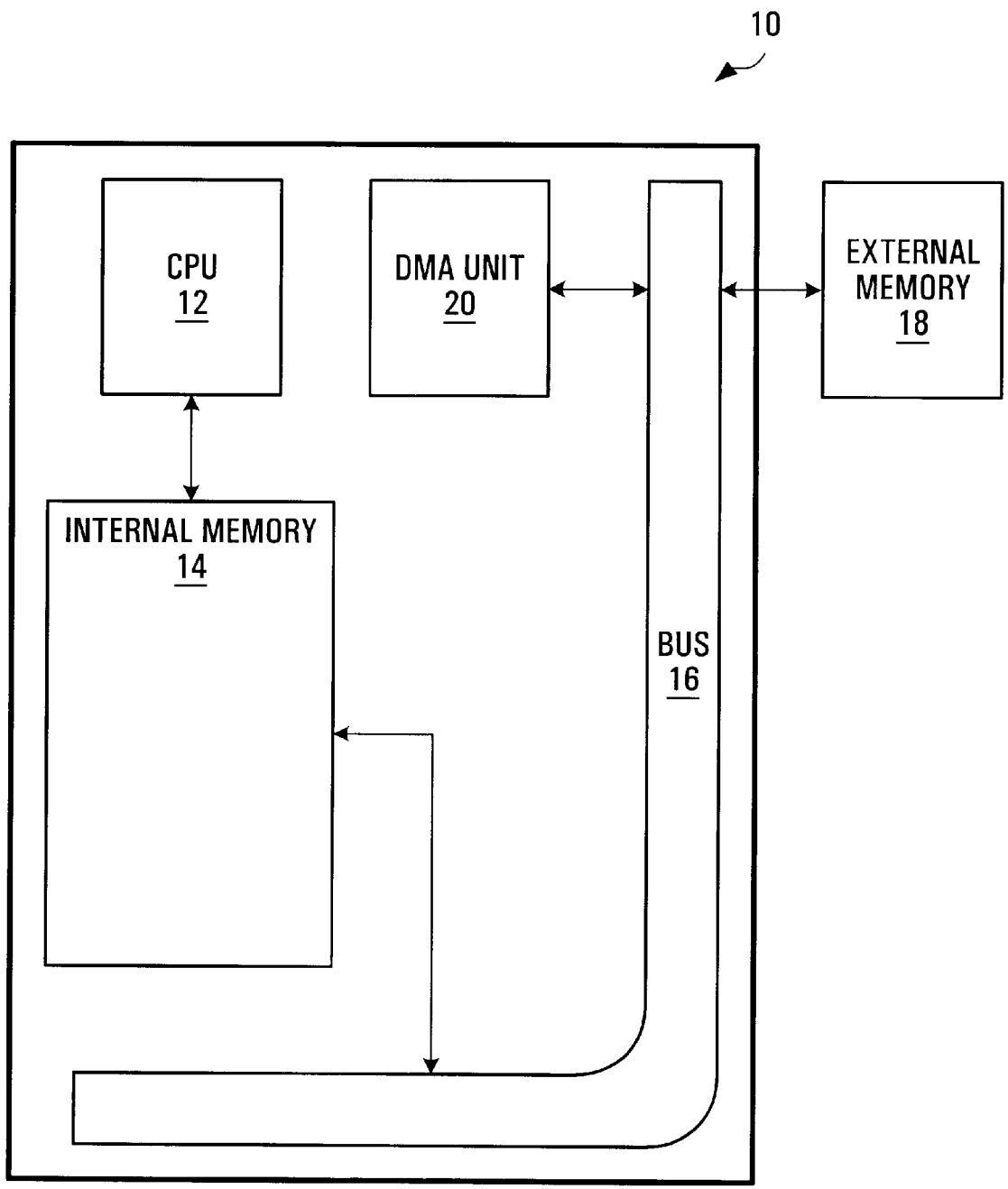
FIG. 6A is a block diagram of a processing platform used to perform the k-stage radix-M FFT of FIG. 5B.

Referring to FIG. 6A, shown is a block diagram of a processing platform used to perform the k-stage radix-M FFT of FIG. 5B. The processing platform, generally indicated by 10, includes a CPU (Central Processor Unit) 12, an internal memory 14, a bus 16, an external memory 18, and a DMA (Direct Memory Access) unit 20. The internal memory 14 is directly accessible by the CPU 12 and when the CPU 12 needs to operate on data stored in the internal memory 14, the CPU 12 retrieves the data directly from the internal memory 14. However, the external memory 18 is indirectly accessible by the CPU 12 through the DMA unit 20. When the CPU 12 needs to operate on data stored in the external memory 18, the CPU 12 issues a command to the DMA unit 20 to retrieve the data. The DMA unit 20 accesses the data in the external memory 18, and imports it across the bus 16 into the internal memory 14, where the processor 12 can process the data. In the event that the internal memory 14 does not have enough memory to store both the data being retrieved and existing data residing in internal memory 14, memory must be freed up. To do so the DMA unit 20 accesses the existing data in the internal memory 14, and exports it across the bus 16 into the external memory 18 before any data is moved into the internal memory 14. As part of processing the data, the processor 12 may generate output data. When the CPU 12 is finished processing the data, the CPU 12 passes the output data back into the internal memory 14. Regarding the internal memory 14, FIG. 6A illustrates only the memory used for performing the k-stage radix-M FFT. It is to be noted that the internal memory is larger than illustrated; the processing platform 10 may perform in parallel other operations. The DMA unit 20 can work independently from the CPU 12 and therefore, while the CPU 12 accesses one memory location the DMA unit 20 can access another memory location, so that full use of the processing platform 10 capabilities is achieved in this way.

In some embodiments of the invention, the processing platform 10 is used to instruct a signal detector to sample N time domain samples of a signal at the sampling frequency, $f_s$, given by $f_s=N\Delta f_{ta}/S$.

In one embodiment of the invention, the internal memory 14 has $M_I=64K$ bytes of memory is available for storing data points and twiddle factors. The external memory 18 has $M_{ex}=2.5M$ bytes of memory available for storage. The memory available for storing data in the internal memory 14 is much smaller than the memory available in the external memory 18.

Figure 6B:
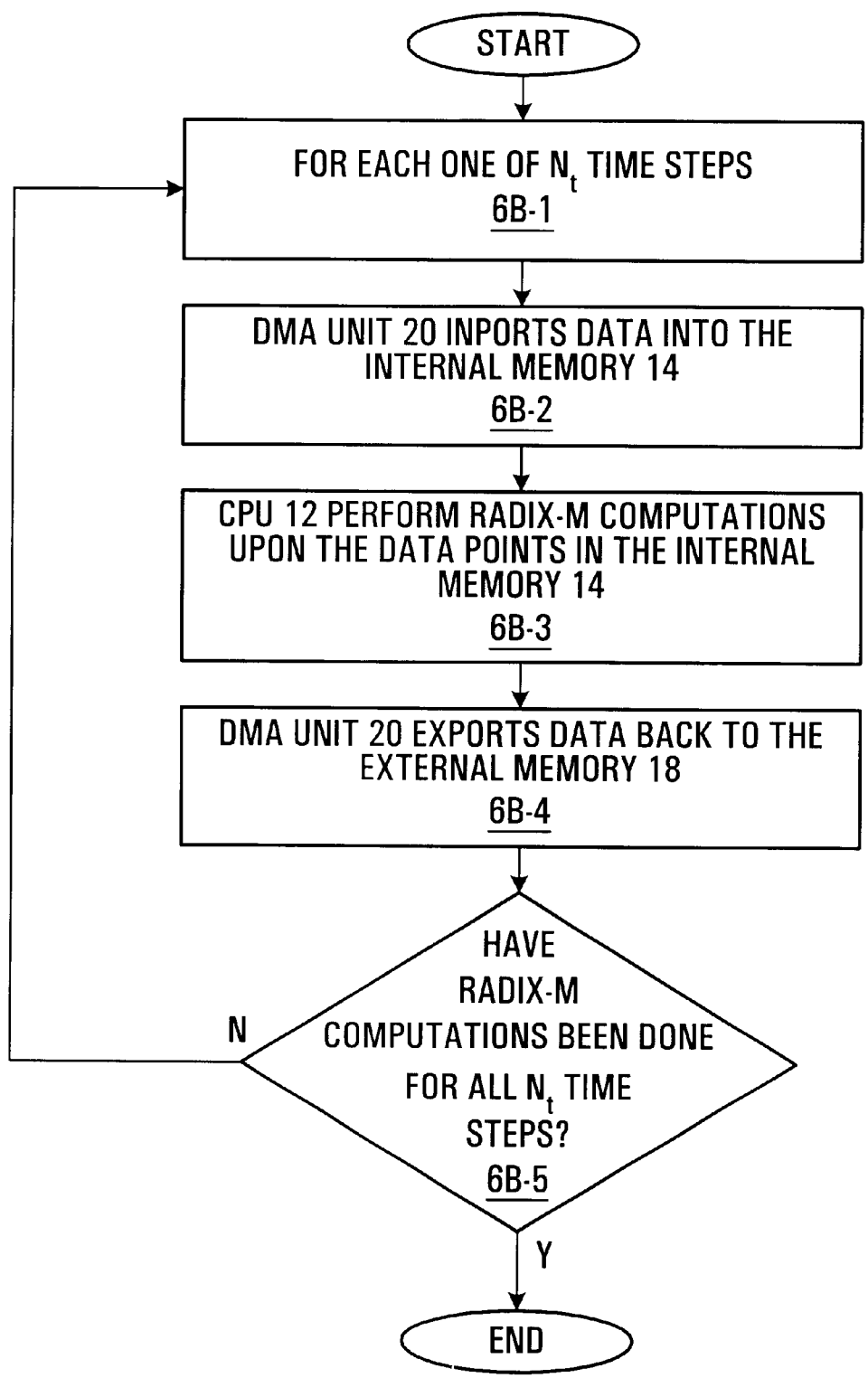
FIG. 6B is a flow chart of a method used by the processing platform of FIG. 6A to perform radix-M computations of stages, r, where $1 \leq r \leq k$, of k stages of the k-stage radix-M FFT of FIG. 5B.
Figure 6C:
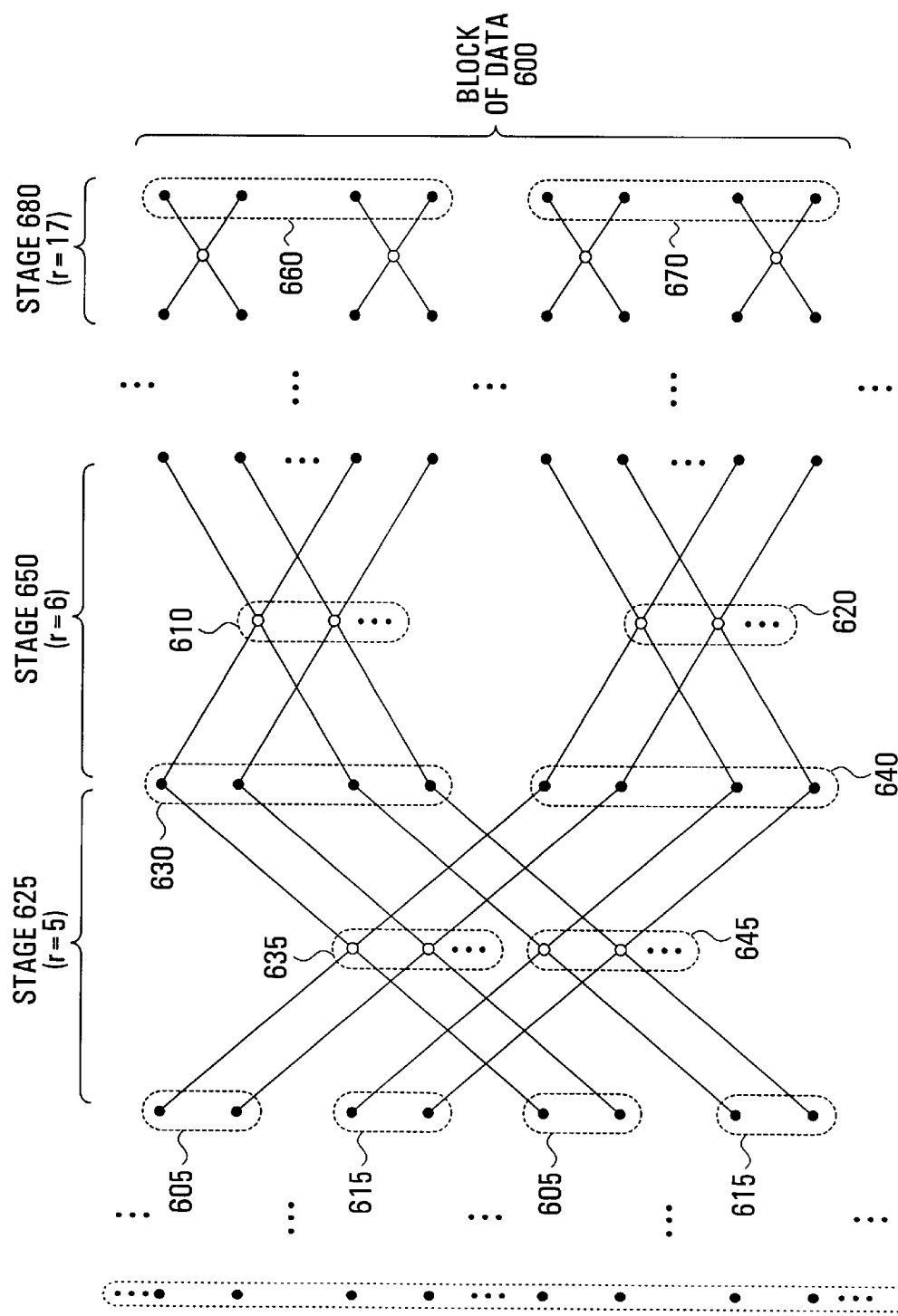
FIG. 6C is a diagram of the k-stage radix-M FFT of FIG. 6B for M=2 and for N=128K data points.

In the illustrative example of FIG. 5A to 5B, a radix-2 FFT of N=128K data points is performed. A data point in FFT computations is complex having real and imaginary parts each requiring 4 Bytes of memory for storage. Thus each one of the data points requires 2×4 Bytes=8 Bytes of memory for storage. The external memory 18 has $M_{ex}=2.5M$ Bytes of memory available and it can store 2.5M Bytes/8 Bytes=312.5K data points which is more than the number N=128K of data points in the example. However, the internal memory 14 has $M_I=64K$ Bytes of memory available for storing the data points and respective twiddle factors. In one embodiment of the invention the radix-2 computations each require two data points of 8 Bytes and one twiddle factors of 8 Bytes for a total of 24 Bytes for each radix-2 computation. The internal memory 14 can therefore store data points and respective twiddle factors for $M_R=2K\leq M_I/24$ Bytes=64K Bytes/24 Bytes=8K/3 radix-2 computations. However, at step 5B-4, for a stage, r, wherein $1\leq r\leq w$, $N/M^r$ radix-M computations are performed. In the illustrative example of FIGS. 5A to 5B, N=128K, M=2 and therefore for a stage, r, $N/M^r\geq N/M^w=128K/2^3=16K$. Therefore, for a stage, r, where $1\leq r\leq w$ the number $N/M^r\geq M_R=2K$ and the internal memory 14 can only hold a fraction of the data points and twiddle factors required to performs the $N/M^r$ radix-2 computations. Similarly, at step 5B-7, for a stage, r, where $w<r\leq k$ the number $N/M^{w+1}=128K/2^{3+1}=8K\geq M_R=2K$ and the internal memory 14 can only hold a fraction of the data points and twiddle factors required to performs the $N/M^{w+1}$ radix-2 computations. FIG. 6B shows a flow chart of a method used to perform the radix-M computations of the stages, r, where $1\leq r\leq k$, of k stages of the k-stage radix-M FFT of FIG 5B (steps 5B-3 to 5B-8). More particularly, FIG. 6B shows a flow chart of a method used to perform steps 5B-3 to 5B-8 of FIG. 5B. For each one of $N_t$ time steps (step 6B-1), the DMA unit 20 imports, from the external memory 18 into the internal memory 14, data points of the data points X(i) and respective twiddle factors required to perform $M_R$ radix-M (where M=2 in the illustrative example) computations (step 6B-2). For a stage, r, where $1\leq r\leq w$, $N_t=N/(M_R M^r)$ and for a stage, r, where $w<r\leq k$, $N_t=N/(M_R M^{w+1})$. The CPU 12 performs $M_R$ radix-M computations upon the data points in the internal memory 14 (step 6B-3). The DMA unit 20 then exports the data points from the internal memory 14 back into the external memory 18 (step 6B-4). At step 6B-5, if radix-M computations have been performed for all $N_t$ time steps then the steps are finished; otherwise return to step 6B-1. In the illustrative example, N=128K, M=2, w=3 and $M_R$=2K, and therefore for a stage, r, where $1 \leq r \leq w$, $N_t = N/(M_R M^r) = 128K/(2K\ M^r) = 64/2^r$. As such, for a stage, r, where $1 \leq r \leq w$, the DMA unit 20 must import and export data points and respective twiddle factors (steps 6B-2 and 6B-4) $N_t = 64/2^r$ times. For a stage, r, where $w < r \leq k$, $N_t = N/(M_R M^{w+1}) = 128K/((2K)(2^{3+1})) = 4$ and the DMA unit 20 must import and export data points and respective twiddle factors (steps 6B-2 and 6B-4) $N_t = 4$ times. However, for a stage, r, wherein $r = k - \log_M(M_R) = 17 - \log_2(2K) = 6$, data points of the data points, X(i), of one of the $N_t = 4$ time steps are not interlaced with other data points of another one of the $N_t = 4$ time steps. This is shown in FIG. 6C. More particularly, FIG. 6C shows a diagram of the k-stage radix-M FFT of FIG. 6B for M=2 and for N=128K data points 690. Only 8 data points of the N=128K data points 690 are shown for clarity. Also shown are three stages, r, 625, 650, 680 with r=5, r=6 and r=k=17, respectively. The three stages, r, 625, 650, 680 are used to determine frequency domain samples associated with data points 660, 670 contained within a block of data 600. Only stages 625, 650, 680 are shown for clarity. Two radix-2 computations of $M_R$=2K radix-2 computations 635 of a first one of the $N_t$=4 time steps are shown for the stage, r=5, 625 and two radix-2 computations of $M_R$=2K radix-2 computations 645 of a second one of the $N_t$=4 time steps are shown for the stage, r=4, 625. Furthermore, two radix-2 computations of $M_R$=2K radix-2 computations 610 of the first one of the $N_t$=4 time steps are shown for a stage, r=6, 650 and two radix-2 computations of $M_R$=2K radix-2 computations 620 of the second one of the $N_t$=4 time steps are shown for the stage, r=6, 650. Data points 605, 615, 630, 640 are used in the $M_R$=2K radix-2 computations 635, 645, 610, 620, respectively. At stage, r=5, 625, the data points 605 are interlaced with the data points 615. However, at stage, r=6, 650, the data points 630 are not interlaced with the data points 640. As such, in some embodiments of the invention, given the data points 630 imported into the internal memory 14, the CPU 12 performs operates on the data points 630 for stages, r, where $6 = k - \log_M(M_R) \leq r \leq k = 17$ including stages 650, 680 to obtain data points 660. Similarly, given the data points 640 imported into the internal memory 14, the CPU 12 operates on the data points 640 for stages, r, where $6 = k - \log_M(M_R) \leq r \leq k = 17$ including stages 650, 680 to obtain data points 670. This reduces the number of times the DMA unit 20 must import and export data.

Figure 6D:
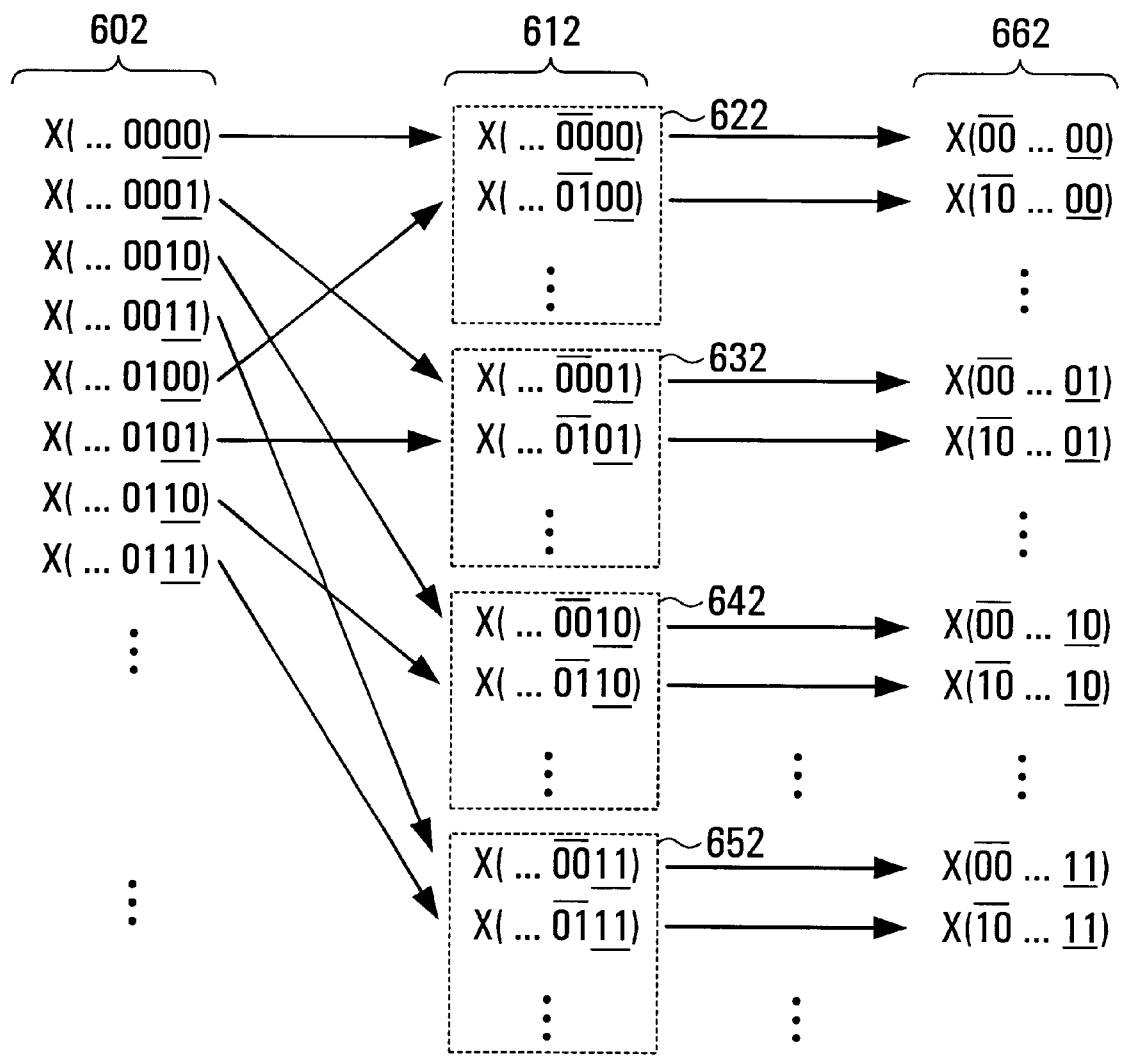
FIG. 6D is a diagram of bit reversal operations performed by a DMA (Direct Memory Access) unit and a CPU of the processing platform of FIG. 6A.

A method used by the processing platform 10 of FIG. 6A perform step 5B-9 of FIG. 5B in which N'=N/S data points within a block of data are re-ordered will now be discussed. As discussed above, in one embodiment, N=128K and S=8 and therefore $N' = N/S = 128K/8 = 16K = M^{k'} = 2^{14}$ data points need to be re-ordered using k'=14 bit reversal operation. However, the internal memory 14 has $M_I$=64K Bytes of memory available which is enough to re-order only up to $M_{dp} < N' = 2^{14}$ data points. For example, in one embodiment, a portion of $M_I/2$=64K Bytes/2=32K Bytes of the internal memory 14 is used to store $M_{dp} = (M_I/2)/8$ Bytes=4K=$M^{k''}$=$2^{12}$ data points of a block of data which require k''=12 bit reversal operations for re-ordering. For each one of the $M_{dp} = M^{k''} = 2^{12}$ data points a k''=12 bit index p and a k''=12 bit index q, wherein q is the bit reversal of p, is required to be stored in a look-up table in the internal memory 14. The indices p and q therefore each require $m_p$=2 Bytes and $m_q$=2 Bytes of memory, respectively, to be stored in the internal memory 14. The look-up table therefore requires $M_{dp}(m_p + m_q) = 2^{12}(2\ Bytes + 2 Bytes) = 2^{14} = 16K$ Bytes. In this embodiment, $M_{dp} < N' = 2^{14}$ and the DMA unit 20 performs a partial re-ordering of the of the N'=N/S=16K data points using the k'-k''=14-12=2 least significant bits of the N'=N/S=16K data points. This is shown in FIG. 6D where data points X(i') of the data points X(i) with index i'=0, 1, . . . , N' at 602 are partially re-ordered at 612, by the DMA unit 20. More particularly, at 602 and 612, the index i' is given in base M=2 notation showing the four least significant bits. The k'-k''=14-12=2 least significant bits at 602 and 612 are underlined to show the partial re-ordering by the DMA unit 20 wherein, at 602, the data points X(i'), are re-ordered in a manner that, at 612, data points, of the data points X(i') having the same k'-k''=2 least significant bits are grouped into one of $M^{k'-k''} = 2^2 = 4$ blocks of data 622, 632, 642, 652 each containing $M_{dp} = M^{k''} = 2^{12}$ data points. At 662, for each blocks of data 622, 632, 642, 652 the DMA unit 20 imports the block of data from the external memory 18 into the internal memory 14, the CPU 12 re-orders data points within the block of data using k''=12 bit reversal operations and then the DMA unit 20 exports the block of data back to the external memory 18. This is shown in FIG. 6D where the data points at 612 have third and fourth least significant bits overlined and at 662 the re-ordered data points have corresponding first and second bits overlined. For example, the data point, X( . . . $\overline{01}\underline{00}$), in the block of data 622 at 612 is mapped onto the data point, X($\overline{10}$. . . $\underline{00}$). Further details of the method used by the DMA unit 20 and the CPU 12 for re-ordering the N'=N/S data points are discussed in U.S. patent application Ser. No. 09/900,153 (JIN), filed Jul. 9, 2001, and incorporated herein by reference.

Typically, time domain samples used in a FFT are real valued. In such cases, a DFT of a sequence of 2N real valued time domain samples can be efficiently computed using a DFT of N complex time domain samples and a split function. A sequence of 2N real valued time domain samples, x(c) wherein c=0, 1, . . . , 2N−1, are split into two sequences of N real valued data points h(i) and g(i) given by $$h(i) = x(2i)\ g(i) = x(2i+1) \quad (2)$$

where i=0, 1, . . . , N−1. An sequence of N complex valued data points, y(i), is given by y(i)=h(i)+jg(i) where $$j = \sqrt{-1}.$$

A DFT of the sequence of N complex valued data points, y(i), is then given by $$Y(n) = \sum_{i=0}^{N-1} y(i) e^{-j2\pi ni/N} = R(n) + jI(n) \quad (3)$$

where n=0, 1, . . . , N−1 and R(n) and I(n) real and imaginary parts of Y(n), respectively. A split function is applied to R(n) and I(n) to obtain N frequency domain samples X'(n) of center frequencies, $f_{cn} = n\Delta f = n f_s/N$. The frequency domain samples X'(n) have real and imaginary parts $X'_r(n)$ and $X'_I(n)$, respectively, where $X'(n) = X'_r(n) + jX'_I(n)$. The real and imaginary parts $X'_r(n)$ and $X'_I(n)$, are given by $$X'_r(n) = \left[\frac{R(n)}{2} + \frac{R(N-n)}{2}\right] + \left[\frac{I(n)}{2} + \frac{I(N-n)}{2}\right]\cos\left(\frac{n\pi}{N}\right) - \left[\frac{R(n)}{2} + \frac{R(N-n)}{2}\right]\sin\left(\frac{n\pi}{N}\right) \quad (4)$$

and

-continued $$X'_i(n) = \left[\frac{I(n)}{2} + \frac{I(N-n)}{2}\right] - \left[\frac{I(n)}{2} + \frac{I(N-n)}{2}\right]\sin\left(\frac{n\pi}{N}\right) - \left[\frac{R(n)}{2} + \frac{R(N-n)}{2}\right]\cos\left(\frac{n\pi}{N}\right),$$

respectively.

In an illustrative example, provided by an embodiment of the invention, $R_t$ (where $R_t$ is an integer with $R_t \geq 1$) dithers are impressed on a signal having Q (where Q is an integer with $Q \geq 1$) channels. A radix-M (where M is an integer with $M \geq 2$) FFT is performed on a sequence of N complex valued data points, y(i), obtained from a sequence of 2N real valued time domain samples, x(c) where c=0, 1, ..., N−1. Each one of the dithers has a unique tone of tone frequency, $f_{ta} = a\Delta f_{ta} + C = (aS+n')\Delta f$ where $a = 0, 1, ..., R_t-1$, and a frequency domain sample X'(n'+aS) of the frequency domain samples, X'(n), is produced for each one of the tones.

Figure 7A:
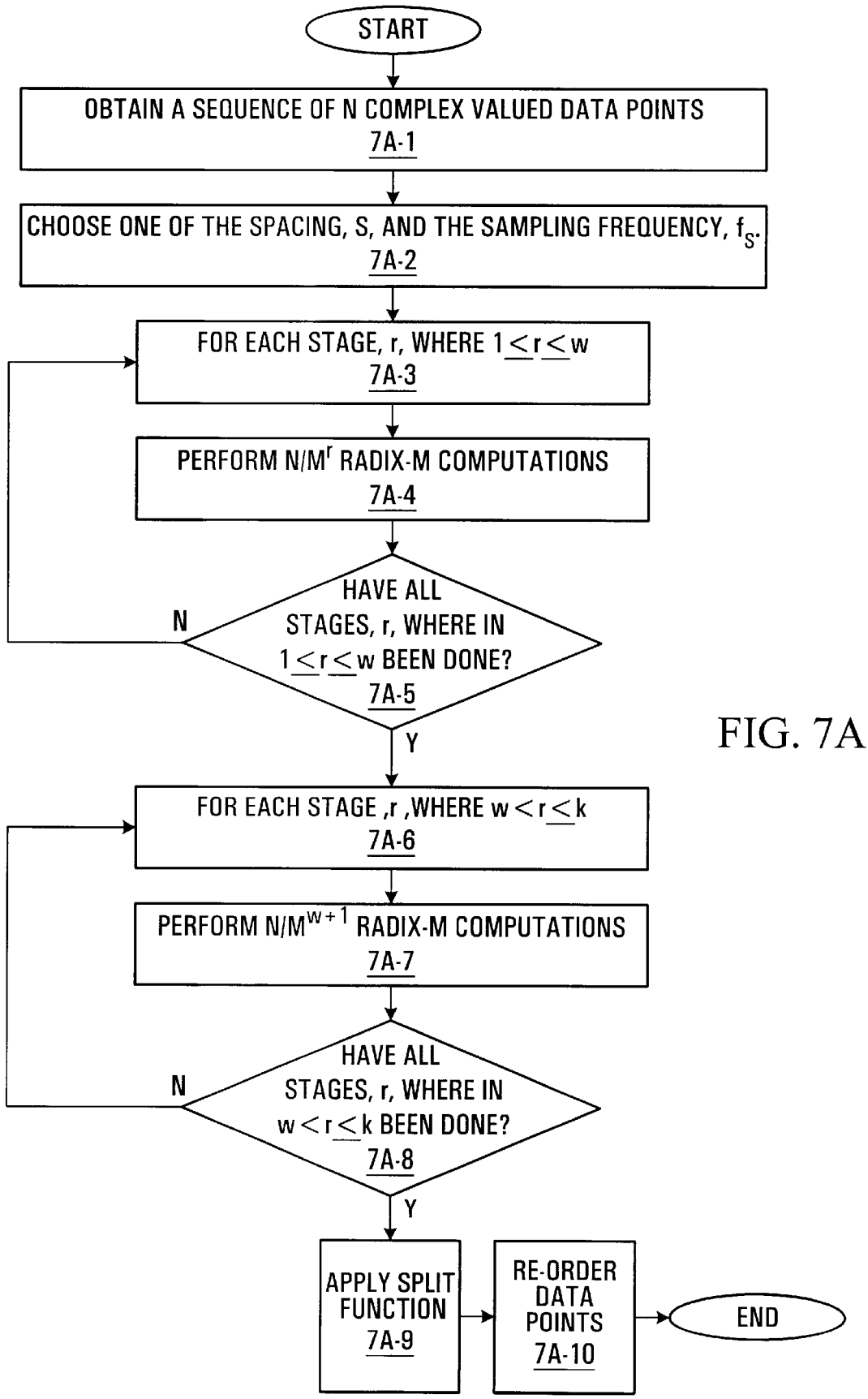
FIG. 7A is a flow chart of a method used to obtain frequency domain samples X'(n'+aS) from a sequence of 2N real valued time domain samples, x(c), provided by another embodiment of the invention.

Referring to FIG. 7A, shown is a flow chart of a method used to obtain the frequency domain samples X'(n'+aS) from the sequence of 2N real valued time domain samples, x(c), provided by another embodiment of the invention. The sequence of N complex valued data points, y(i), given by y(i)=h(i)+jg(i) is obtained from the sequence of 2N real valued time domain samples x(c) using equation (2) (step 7A-1). At step 7A-2 the sampling frequency, $f_s$, is chosen so that $f_s = N\Delta f_{ta}/S$ is satisfied with $S = M^w$. Further, at step 7A-2, the sampling frequency, $f_s$, is also chosen such that the block number, d, of a block of data containing N'=N/S data points used for obtaining the frequency samples X'(n'+aS) using the split function of equation (4) satisfies d=0 or S/2 when S is an even number and satisfies d=0 when S is an odd number. This is discussed in more detail below with reference to FIGS. 7B and 7C. For each stage, r, wherein $1 \leq r \leq w$ (step 7A-3), $N/M^r$ radix-M computations are performed (step 7A-4). Furthermore, the $N/M^r$ radix-M computations are performed upon a respective subset of the sequence of N complex valued data points, upon which data points of interest, corresponding to the data points contained in the block of data of block number, d, are dependent. At step 7A-5, if all stages, r, wherein $1 \leq r \leq w$ have been done then go to step 7A-6; otherwise return to step 7A-3. At step 7A-6, for each stage r, wherein $w < r \leq k$, $N/M^{w+1}$ radix-M computations are performed (step 7A-7). Furthermore, the $N/M^{w+1}$ radix-M computations are performed upon a respective subset of the sequence of N complex valued data points, upon which the data points of interest are dependent. At step 7A-8, if all stages, r, wherein $w < r \leq k$ have been done then go to step 7A-9; otherwise return to step 7A-6. At step 7A-8, after radix-M computations are performed for all stages, r, where $w < r \leq k$ data points of the sequence of N complex valued data points, y(i), correspond to the frequency domain samples Y(n) with the real and imaginary parts R(n) and I(n), respectively. At step 7A-9, the real and imaginary parts, X'$_r$(n) and X'$_i$(n), respectively, of the frequency domain samples X'(n) are calculated using the split function of equation (4). Furthermore, the split function of equation (4) is applied for values of n satisfying $(d-1)S \leq n < dS$. At step 7A-10, the frequency domain samples X'(n) having values of n satisfying $(d-1)S \leq n < dS$ are re-ordered using bit reversal operations to obtain the frequency domain samples X'(n'+aS). Once the frequency domain samples, X'(n'+aS), are determined, a power associated with a frequency domain sample, of the frequency domain samples, containing one of the unique tones is converted into a channel power of a respective one of the Q channels.

Note that in equation (4) each one of X'$_r$(n) and X'$_i$(n) of the frequency domain samples X'(n) depends on R(n), R(N−n), I(n) and I(N−n). Since Y(n)=R(n)+jI(n) and Y(N−n)=R(N−n)+jI(N−n), each one of X'$_r$(n) and X'$_i$(n) implicitly depends on Y(n) and Y(N−n) and, as such, Y(n) and Y(N−n) are not necessarily contained within the same block of data. This is now illustrated with reference to FIGS. 7B and 7C. In one example, S is an even integer and more particularly $S = M^w = 2^3 = 8$. In such a case, a frequency domain sample Y(n) is contained within one of S=8 blocks of data with block number, d, wherein $0 \leq d \leq S-1 = 7$. Shown in FIG. 7B is a table showing the correspondence between least significant bits of an index n and least significant bits of an index N−n for S=8 blocks of data with block number, d, at 710. The w=3 least significant bits of the index n given by n=St+d=8t+d at 720 where $0 \leq d \leq S-1=7$ and where t is an integer, are given at 730. Corresponding w=3 least significant bits of the index N−n are given in at 740. When d=0, the w=3 least significant bits of n at 730 are 000 and the w=3 least significant bits of N−n at 740 are also 000. Similarly, when d=S/2=8/2=4, the w=3 least significant bits of n at 730 correspond to the w=3 least significant bits of N−n at 740. However, for the remaining values of d, the w=3 least significant bits of n at 730 do not correspond to the w=3 least significant bits of N−n at 740. Consequently, for d=0, S/2=0, 4, Y(n) and Y(N−n) are contained within the same block of data and for d≠0,S/2=0,4, Y(n) and Y(N−n) are not contained within the same block of data. When S is an odd integer conditions are different. In another example, $S = M^w = 3^2 = 9$. In such an case the frequency domain samples Y(n) and Y(N−n) are each contained within one of S=9 blocks of data having a respective block number, d, wherein $0 \leq d \leq S-1=8$. Shown in FIG. 7C is a table showing the correspondence between least significant bits of n and least significant bits of N−n for S=9 blocks of data. The w=2 least significant bits of the index n given by n=St+d=9t+d at 760 where $0 \leq d \leq S-1=8$ at 750, are given at 770. Corresponding w=2 least significant bits of the index N−n are given at 780. The w=2 least significant bits of n in column 770 correspond to the w=2 least significant bits of N−n in column 780 only when d=0.

As discussed above, values of the block number, d, are given by d=mod(n',S). Therefore, in embodiments of the invention, to assure that the frequency domain samples are contained within the same block of data the sampling frequency, $f_s$, is chosen at step 7A-2, such that d=0 or S/2 when S is an even integer or such that d=0 when S is an odd number.

Numerous modifications and variations of the present invention are possible in light of the above teachings. It is therefore to be understood that within the scope of the appended claims, the invention may be practised otherwise than as specifically described herein.

We claim:

1. A method of performing a radix-M FFT (Fast Fourier Transform), wherein M is an integer satisfying $M \geq 2$, the method comprising:

sampling a signal, containing tones, with a sampling frequency, $f_s$, to produce N time domain samples each initializing a respective one of N data points, wherein N is an integer; and to produce frequency domain samples having a frequency bandwidth $\Delta f = f_s/N$ and center frequencies of frequency spacing $M^w \Delta f$ with w being an integer satisfying $w \geq 1$:
performing, for each one of k stages wherein $k = \log_M(N)$, radix-M computations upon a respective subset of the N data points, wherein the respective subset contains only data points upon which the frequency domain samples that contain the tones are dependent;

wherein the sampling frequency, $f_s$, is such that the frequency domain samples contain the tones.

2. A method according to claim 1 wherein the performing, for each one of k stages wherein $k=\log_M(N)$, radix-M computations comprises:

for a stage, r, of the k stages wherein r is an integer satisfying $1 \leq r \leq w$, performing $N/M^r$ radix-M computations upon the respective subset of the N data points; and for a stage, r, of the k stages wherein $w < r \leq k$, performing $N/M^{w+1}$ radix-M computations upon the respective subset of the N data points.

3. A method according to claim 2 wherein the performing, for each one of k stages wherein $k=\log_M(N)$, radix-M computations comprises a total of $N_{comp}$ radix-M computations given by $$N_{comp} = \frac{N}{S}\left(\frac{k-w}{M} + \frac{M^w - 1}{M - 1}\right).$$

4. A method according to claim 1 wherein the tones have a frequency spacing, $\Delta f_{ta}$, and the sampling frequency, $f_s$, satisfies $f_s = N\Delta f_{ta}/M^w$.

5. A method according to claim 4 applied to a WDM (Wavelength Division Multiplexed) optical signal having a plurality of channels wherein at least some of which each have impressed a unique dither resulting in a respective unique tone of the tones, the respective unique tone having a tone frequency, $f_{ta}$, satisfying $f_{ta} = a\Delta f_{ta} + C$ where a is an integer and C in a positive real number.

6. A method of determining channel power of the WDM optical signal of claim 5 comprising converting a power associated with a respective one of the frequency domain samples into a channel power.

7. A method according to claim 5 wherein $C=n'\Delta f$, wherein n' is an integer and wherein the tone frequency, $f_{ta}$, satisfies $f_{ta} = (aS+n')\Delta f$ wherein S is an integer satisfying $S=M^w$.

8. A method according to claim 7 comprising identifying which block of data of block number d, of S blocks of data each comprising $N'=N/S$ respective data points of the N data points, contains data points upon which the frequency domain samples are dependent, d and N' being integers and wherein $d=\text{mod}(n',S)$.

9. A method according to claim 8 comprising re-ordering, using bit reversal operations, data points contained in the block of data of block number d.

10. A method according to claim 1 comprising performing the radix-M FFT using DIF (Decimation In Frequency).

11. A method according to claim 1 comprising performing the radix-M FFT using DIT (Decimation In Time).

12. A method of performing a radix-M FFT, wherein M is an integer satisfying $M \geq 2$, the method comprising:

sampling a signal, containing tones, with a sampling frequency, $f_s$, to produce a sequence of 2N real valued time domain samples, wherein N is an integer;

splitting the sequence of 2N real valued time domain samples into two sequences of N real valued data points and combining the two sequences of N real valued data points into a sequence of N complex valued data points; and to produce frequency domain samples having a frequency bandwidth, $\Delta f = f_s/N$, and center frequencies of frequency spacing $M^w \Delta f$ with w being an integer satisfying $w \geq 1$, comprising:

performing, for each one of k stages wherein $k=\log_M(N)$, radix-M computations upon a respective subset of the sequence of N complex valued data points, wherein the respective subset contains only data points upon which the frequency domain samples are dependent; and applying a split function only to data points of the sequence of N complex valued data points upon which the frequency domain samples are dependent after the performing, for each one of k stages wherein $k=\log_M(N)$, radix-M computations;

wherein the sampling frequency, $f_s$, is such that the frequency domain samples contain the tones.

13. A method according to claim 12 comprising re-ordering, using bit reversal operations, data points obtained from the split function which correspond to the frequency domain samples.

14. A method according to claim 12 applied to a signal containing tones of tone frequencies, $f_{ta}$, given by $f_{ta} = (aS+n')\Delta f$, wherein a, n' and S are integers with $S=M^w$, the method comprising:

identifying which block of data of block number d, of S blocks of data each containing $N'=N/S$ respective data points of the sequence of N complex valued data points, contains data points upon which the split function is applied, wherein d and N' are integers; and wherein $d=\text{mod}(n',S)$ and the sampling frequency, $f_s$, being such that d is one of $d=0$ and $d=S/2$ when S is an even integer and $d=0$ when S is an odd integer.

15. A processing apparatus adapted to perform a radix-M FFT upon N time domain samples, wherein N and M are integers with $M \geq 2$, sampled at a sampling frequency, $f_s$, from a signal containing tones to produce frequency domain samples that contain the tones, the apparatus comprising:

a memory adapted to store data comprising N data points each being initialized by a respective one of the N time domain samples;

a processor capable of accessing the memory and adapted to:

perform, for each one of k stages wherein $k=\log_M(N)$, radix-M computations upon a respective subset of the N data points, wherein the respective subset contains only data points upon which the frequency domain samples that contain the tones are dependent;

wherein the frequency domain samples have a frequency bandwidth, $\Delta f = f_s/N$, and have center frequencies of frequency spacing $M^w \Delta f$ with w being an integer satisfying $w \geq 1$, the sampling frequency, $f_s$, being such that the frequency domain samples contain the tones.

16. An apparatus according to claim 15 wherein the processor is adapted to perform:

for a stage, r, of the k stages wherein r is an integer satisfying $1 \leq r \leq w$, $N/M^r$ radix-M computations upon a respective subset of the N data points upon which the frequency domain samples that contain the tones are dependent; and for a stage, r, of the k stages wherein $w < r \leq k$, performing $N/M^{w+1}$ radix-M computations upon a respective subset of the N data points upon which the frequency domain samples that contain the tones are dependent.

17. An apparatus according to claim 16 wherein the processor is adapted to perform a total of $$N_{comp} = \frac{N}{S}\left(\frac{k-w}{M} + \frac{M^w - 1}{M-1}\right)$$

radix-M computations which comprise the $N/M^r$ radix-M computations and the $N/M^{w+1}$ radix-M computations.

18. An apparatus according to claim 15 wherein successive tones of the tones have a constant frequency spacing, $\Delta f_{ta}$, and the sampling frequency, $f_s$, satisfies $f_s = N\Delta f_{ta}/M^w$.

19. An apparatus according to claim 18 wherein the processor is adapted to instruct a signal detector to sample the N time domain samples at the sampling frequency, $f_s$, given by $f_s = N\Delta f_{ta}/M^w$.

20. An apparatus according to claim 18 applied to a WDM optical signal having a plurality of channels wherein at least some of which each have impressed a unique dither resulting in a respective unique tone of the tones, the respective unique tone having a tone frequency, $f_{ta}$, satisfying $f_{ta} = a\Delta f_{ta} + C$ where a is an integer and C in a positive real number.

21. An apparatus according to claim 20 wherein the processor is further adapted to convert a power associated with a frequency domain sample, of the frequency domain samples that contain the tones, into a channel power of a respective one of the plurality of channels.

22. An apparatus according to claim 20 wherein $C=n'\Delta f$, wherein n' is an integer and wherein the tone frequency, $f_{ta}$, satisfies $f_{ta}=(aS+n')\Delta f$ wherein S is an integer satisfying $S=M^w$.

23. An apparatus according to claim 20 wherein the processor is adapted to identify which block of data of block number d, of S blocks of data each comprising $N'=N/S$ respective data points of the N data points, contains data points upon which the frequency domain samples that contain the tones are dependent, wherein d and N' are integers and wherein $d=\mod(n',S)$.

24. An apparatus according to claim 15 wherein the processor is adapted to perform the radix-M FFT using DIF.

25. An apparatus according to claim 15 wherein the processor is adapted to perform the radix-M FFT using DIT.

26. An apparatus according to claim 15 comprising a DMA (Direct Memory Access) unit and wherein the memory comprises an internal memory and an external memory, the external memory being adapted to store the N data points and respective twiddle factors used in the $N/M^r$ radix-M computations and the $N/M^{w+1}$ radix-M computations and the DMA unit being adapted to import and export any of the N data points and the respective twiddle between the internal memory and the external memory.

27. An apparatus according to claim 26 wherein the DMA unit is adapted to partially re-order the frequency domain samples that contain the tones using bit reversal operations and wherein the processor is adapted to re-order the frequency domain samples that contain the tones, which are partially re-ordered, using bit reversal operations.

28. An apparatus according to claim 15 adapted to re-order the frequency domain samples that contain the tones using bit reversal operations.

29. An apparatus according to claim 15 wherein the processor is a CPU (Central Processor Unit).

30. A processing apparatus adapted to perform a radix-M FFT upon a sequence of 2N real valued time domain samples, wherein N and M are integers with $M \geq 2$, sampled at a sampling frequency, $f_s$, from a signal containing tones to produce frequency domain samples that contain the tones, the apparatus comprising:

a memory adapted to store data comprising the sequence of 2N real valued time domain samples;

a processor capable of accessing the memory and adapted to:

split the sequence of 2N real valued time domain samples into two sequences of N real valued data points and combine the two sequences of N real valued data points into a sequence of N complex valued data points;

perform, for each one of k stages wherein $k=\log_M(N)$, radix-M computations upon a respective subset of the sequence of N complex valued data points, wherein the respective subset contains only data points upon which the frequency domain samples that contain the tones are dependent; and apply a split function only to data points of the sequence of N complex valued data points upon which the frequency domain samples that contain the tones are dependent after the radix-M computations are performed for each one of the k stages;

wherein the frequency domain samples have a frequency bandwidth, $\Delta f = f_s/N$, and center frequencies of frequency spacing $M^w \Delta f$ with w being an integer satisfying $w \geq 1$, the sampling frequency, $f_s$, being such that the frequency domain samples contain the tones.

31. An apparatus according to claim 30 adapted to re-order, using bit reversal operations, data points obtained from the split function which correspond to the frequency domain samples that contain the tones.

32. An apparatus according to claim 30 applied to a signal containing tones of tone frequencies, $f_{ta}$, given by $f_{ta}=(aS+n')\Delta f$, wherein a, n' and S are integers with $S=M^w$, the processor being adapted to identify which block of data of block number d, of S blocks of data each containing $N'=N/S$ respective data points of the sequence of N complex valued data points, contains data points upon which the split function is applied, wherein d and N' are integers; and wherein $d=\mod(n',S)$ and wherein the sampling frequency, $f_s$, is such that d is one of $d=0$ and $d=S/2$ when S is an even integer and $d=0$ when S is an odd integer.

33. An article of manufacture comprising:

a computer usable medium having computer readable program code means embodied therein for causing a radix-M FFT upon a sequence of N time domain samples, wherein N and M are integers with $M \geq 2$, sampled at a sampling frequency, $f_s$, from a signal containing tones to produce frequency domain samples that contain the tones, the N time domain samples each initializing a respective one of N data points and the computer readable code means in said article of manufacture comprising:

computer readable code means for performing, for each one of k stages wherein $k=\log_M(N)$, radix-M computations upon a respective subset of the N data points, wherein the respective subset contains only data points upon which the frequency domain samples that contain the tones are dependent;

computer readable code means for determining the sampling frequency, $f_s$, so that the frequency domain samples have a frequency bandwidth, $\Delta f = f_s/N$, and have center frequencies of frequency spacing $M^w \Delta f$ with w being an integer satisfying $w \geq 1$, and so that the frequency domain samples contain the tones.

34. An article of manufacture according to claim 33 comprising computer readable code means for re-ordering, using bit reversal operations, data points of the N data points, which correspond to the frequency domain samples that contain the tones after the radix-M computations are performed for each one of the k stages.

35. An article of manufacture comprising:

a computer usable medium having computer readable program code means embodied therein for causing a radix-M FFT upon a sequence of 2N real valued time domain samples, wherein N and M are integers with M≧2, sampled at a sampling frequency, $f_s$, from a signal containing tones to produce frequency domain samples that contain the tones, the computer readable code means in said article of manufacture comprising:

computer readable code means for splitting the sequence of 2N real valued time domain samples into two sequences of N real valued data points and combining the two sequences of N real valued data points into a sequence of N complex valued data points; and computer readable code means for performing, for each one of k stages wherein k=$\log_M(N)$, radix-M computations upon a respective subset of the N complex valued data points, wherein the respective subset contains only data points upon which the frequency domain samples that contain the tones are dependent;

computer readable code means for applying a split function only to data points of the sequence of N complex valued data points upon which the frequency domain samples are dependent after the performing, for each one of k stages wherein k=$\log_M(N)$, radix-M computations; and computer readable code means for determining the sampling frequency, $f_s$, so that the frequency domain samples have a frequency bandwidth, $\Delta f = f_s/N$, and have center frequencies of frequency spacing $M^w \Delta f$ with w being an integer satisfying w≧1, and so that the frequency domain samples contain the tones.

36. An article of manufacture according to claim 35 comprising computer readable code means for re-ordering, using bit reversal operations, data points obtained from the split function which correspond to the frequency domain samples that contain the tones.

* * * * *